(12) United States Patent
Sakoda

(10) Patent No.: US 7,545,872 B2
(45) Date of Patent: Jun. 9, 2009

(54) SIGNAL COMPONENT DEMULTIPLEXING APPARATUS, FILTER APPARATUS, RECEIVING APPARATUS, COMMUNICATION APPARATUS, AND COMMUNICATION METHOD

(75) Inventor: Kazuyuki Sakoda, Tokyo (JP)

(73) Assignee: Sony Corporation (JP)

( * ) Notice: Subject to any disclaimer, the term of this patent is extended or adjusted under 35 U.S.C. 154(b) by 323 days.

(21) Appl. No.: 11/592,422

(22) Filed: Nov. 3, 2006

(65) Prior Publication Data

US 2007/0053457 A1 Mar. 8, 2007

Related U.S. Application Data

(62) Division of application No. 10/926,190, filed on Aug. 25, 2004, now Pat. No. 7,133,458, which is a division of application No. 09/783,809, filed on Feb. 15, 2001, now Pat. No. 6,816,555.

(30) Foreign Application Priority Data

Feb. 18, 2000 (JP) ............................ P2000-046820

(51) Int. Cl.
*H04K 1/10* (2006.01)
*H04L 27/28* (2006.01)
(52) U.S. Cl. .................. 375/260; 375/340; 375/316; 370/341; 370/343
(58) Field of Classification Search ................ 375/260, 375/316, 259, 340; 370/341, 343, 329, 336, 370/337

See application file for complete search history.

(56) References Cited

U.S. PATENT DOCUMENTS

| | | | |
|---|---|---|---|
| 5,416,801 A | 5/1995 | Chouly et al. | |
| 5,548,582 A | 8/1996 | Brajal et al. | |
| 6,169,768 B1 | 1/2001 | Okada et al. | |
| 6,188,717 B1 | 2/2001 | Kaiser et al. | |
| 6,381,234 B2 | 4/2002 | Sakoda et al. | |
| 6,563,881 B1 * | 5/2003 | Sakoda et al. | 375/260 |
| 6,628,673 B1 | 9/2003 | McFarland et al. | |

FOREIGN PATENT DOCUMENTS

JP 2000-332722 A 11/2000

* cited by examiner

*Primary Examiner*—Phuong Phu
(74) *Attorney, Agent, or Firm*—Lerner, David, Littenberg, Krumholz & Mentlik, LLP

(57) ABSTRACT

A communication apparatus, a signal component demultiplexing apparatus, and a filter apparatus to reduce a load of FFT processing in a receiver in multi-carrier communication. The receiving apparatus provides a signal component demultiplexing apparatus before an FFT circuit and extracts only the required symbol series. The signal component demultiplexing apparatus has hierarchically arranged branching circuits each including a symbol delay circuit, a phase offset adjustment circuit, an adder circuit, and a subtractor circuit, one symbol string being output from the adder circuit and another symbol string being output from the subtractor circuit.

6 Claims, 17 Drawing Sheets

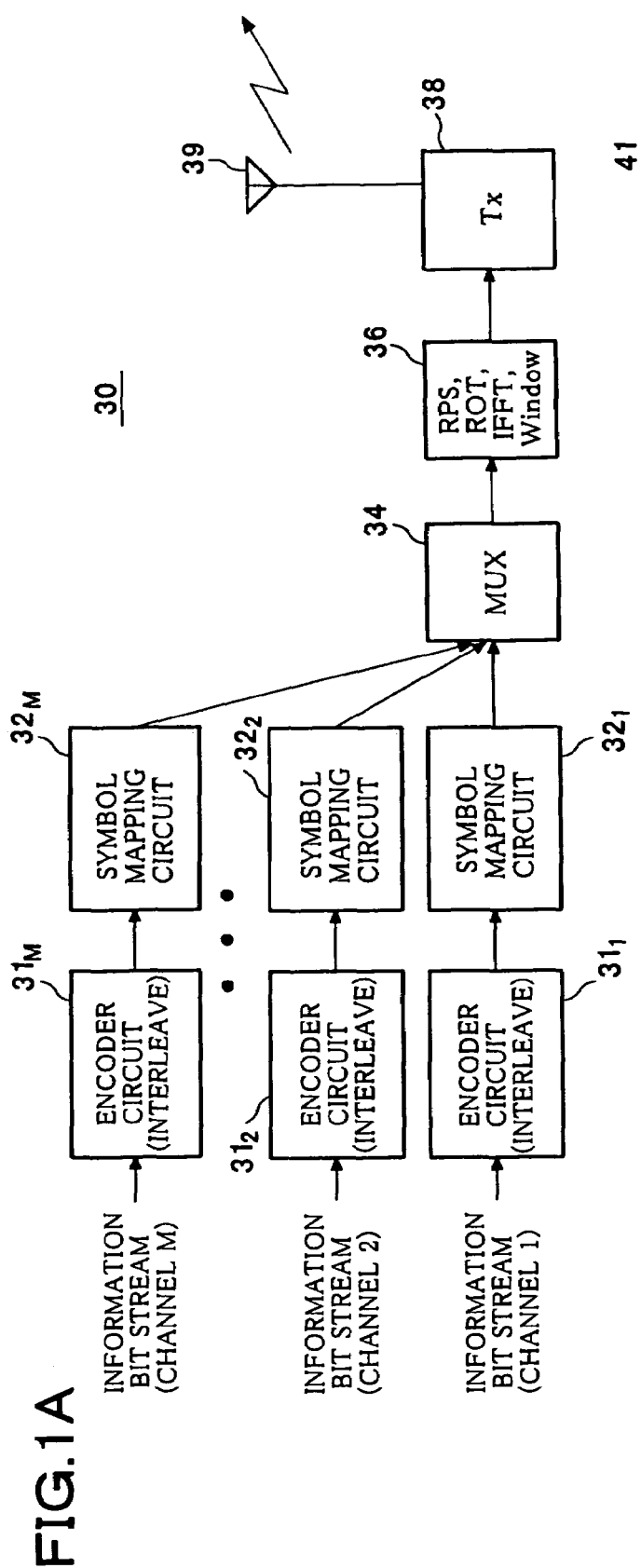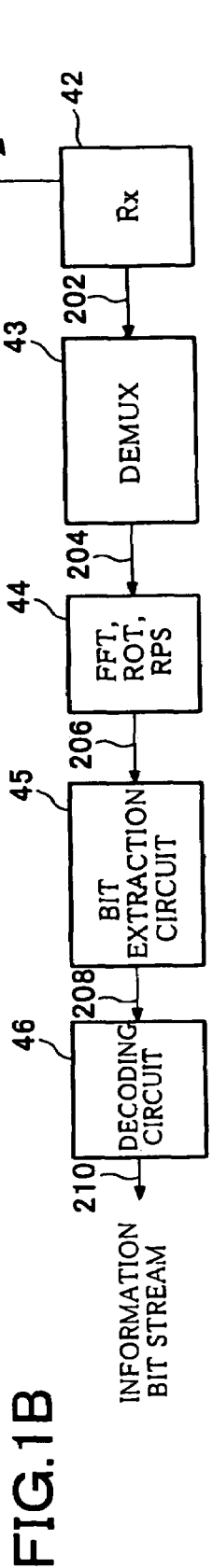

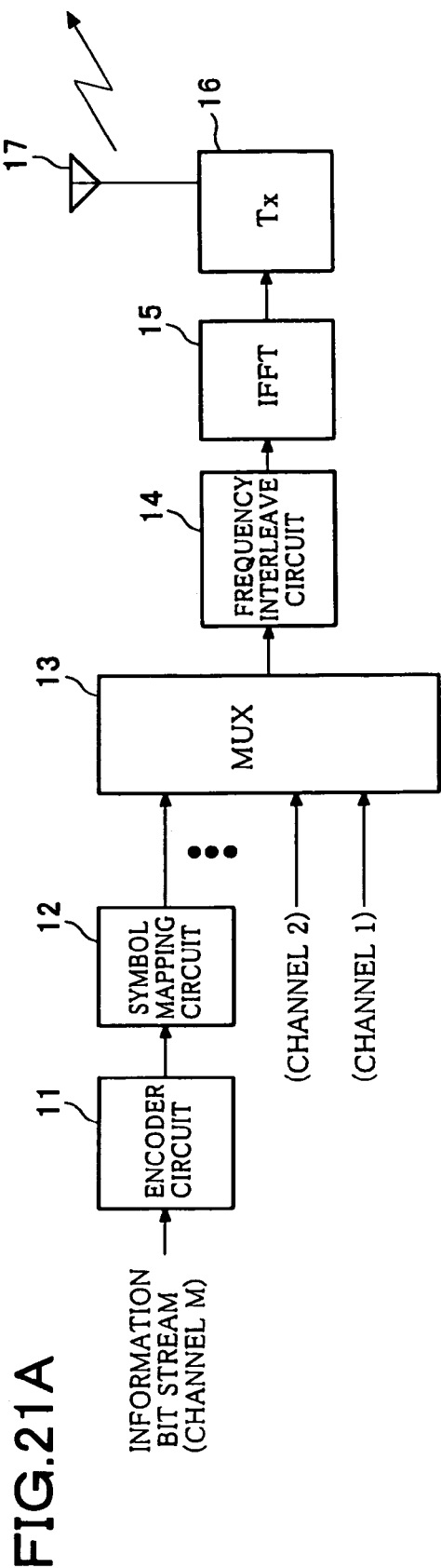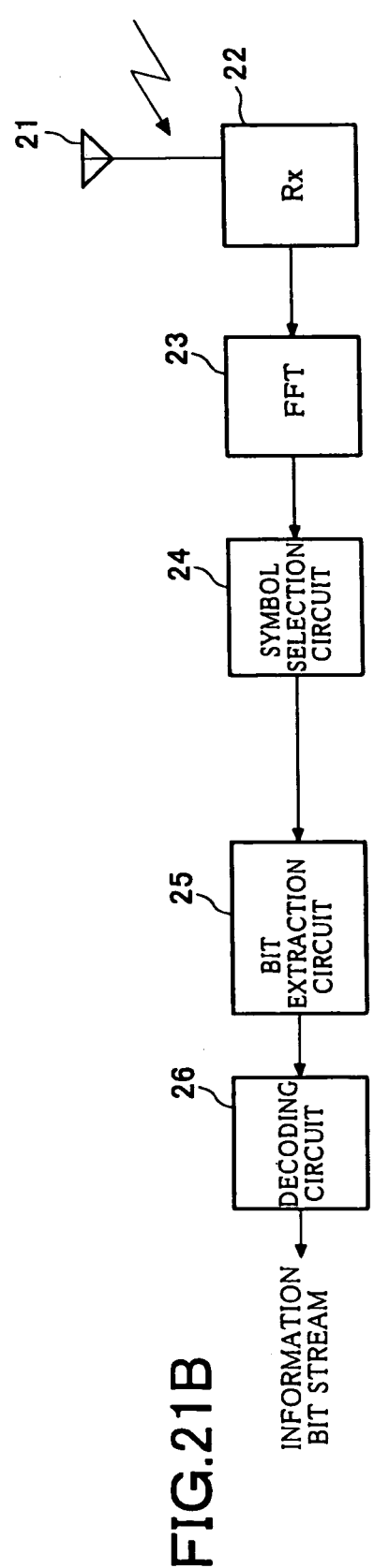

SIGNAL COMPONENT DEMULTIPLEXING APPARATUS, FILTER APPARATUS, RECEIVING APPARATUS, COMMUNICATION APPARATUS, AND COMMUNICATION METHOD

CROSS-REFERENCE TO RELATED APPLICATIONS

This application is a division of U.S. application Ser. No. 10/926,190 filed on Aug. 25, 2004, now U.S. Pat. No. 7,133,458, which is a division of U.S. application Ser. No. 09/783,809 filed on Feb. 15, 2001, now U.S. Pat. No. 6,816,555, the disclosures of which are hereby incorporated by reference herein, and claims priority from Japanese Application No. 2000-046820 filed on Feb. 18, 2000.

BACKGROUND OF THE INVENTION

1. Field of the Invention

The present invention relates to a communication apparatus (communication system), transmitter and receiver, and communication method, more particularly relates to a digital communication apparatus (system) for multi-carrier modulation, a wireless transmitter (wireless transmitting apparatus) and a wireless receiver (wireless receiving apparatus) used in a digital communication apparatus (system), and a communication method of the same.

More specifically, the present invention relates to a signal component demultiplexing apparatus for demultiplexing a multi-carrier signal multiplexed by orthogonal frequency division multiplexing (OFDM) to a symbol series, a filter apparatus for extracting specific symbols from a multi-carrier signal, and a signal receiving apparatus having these signal component demultiplexing apparatus, filter apparatus, etc.

2. Description of the Related Art

As an example of a signal modulated by OFDM, one of a digital audio broadcasting (DAB) system will be described.

The DAB system is known as a high quality digital audio terrestrial broadcasting method enabling mobile reception developed by the EUREKA 147 project. Progress is being made in commercialization of digital satellite audio broadcasting using the DAB system for the satellite broadcasting.

As the modulation method used in such a digital communication system (apparatus), OFDM has been proposed due to its tolerance to multi-path fading, ghosts, etc.

OFDM is a multi-carrier modulation method usually using tens to hundreds of orthogonal carriers. Each carrier is modulated by a modulation method such as quadrature amplitude modulation (QAM) or phase shift keying (PSK).

In the DAB system etc., digital audio signals of multiple channels are transmitted by multi-carrier communication.

FIGS. 21A and 21B are views of an example of the configuration of a digital wireless communication system used in a DAB system or the like using OFDM as the multi-carrier modulation method. FIGS. 21A and 21B illustrate parts of the DAB system in a simple form.

In the following explanation, the DAB system will be illustrated and the explanation made focusing on multiplexing.

A wireless transmitting apparatus 10 of an OFDM type wireless communication system illustrated in FIG. 21A has an encoder circuit 11, a symbol mapping circuit 12, a multiplexer (signal multiplexing circuit) 13, a frequency interleave circuit 14, an inverse fast Fourier transform (IFFT) circuit 15, a wireless transmitter circuit 16, and an antenna 17.

An information bit stream is encoded, interleaved, and otherwise processed in the encoder circuit 11, then its bits are mapped to transmission symbols in the symbol mapping circuit 12. This work is separately carried out for every channel. In the example shown in FIG. 21A, for example, 64 ksps (symbols/sec) of symbols are created per channel.

These symbol streams are simply connected in series in the multiplexer 13 to form a multiplexed symbol stream. For example, if 18 channels of 64 ksps per channel are multiplexed, the transmission rate of the multiplexed symbol stream becomes 1152 ksps (=18×64 ksps).

The symbols of the multiplexed symbol stream are rearranged by frequency interleaving in the frequency interleave circuit 14. The symbols of each channel are dispersed by this work.

Next, the dispersed symbols of the symbol stream are arranged on the frequency axis, then the symbol expressions on the frequency axis are transformed to symbols on the time axis by the IFFT processing in the inverse fast Fourier transform (IFFT) circuit 15, which are then sent from the transmitter circuit 16 via the antenna 17 into the air.

An example of the symbol string comprised of the six carriers formed into a multi-carrier signal output from the transmitting apparatus 10 is illustrated in FIG. 22.

Up until now, specific symbols among a plurality of symbols (symbol series) formed into the above multi-carrier signal have not been solely extracted.

Therefore, we suppose the wireless signal receiver extracts the intended symbols or carrier components from the symbol series illustrated in FIG. 22 using an existing technique.

FIG. 23 is a view of a first method for demultiplexing a multi-carrier signal.

In this method, a plurality of band pass filters having frequency band characteristics of the corresponding carriers are provided. The corresponding symbols are extracted by these band pass filters. As such filters, use can be made of for example comb type filters.

However, such a method is unsuitable for demultiplexing symbols of a modulation method such as OFDM where the carriers are crammed together. Namely, with a modulation method using OFDM, a large number of carriers are crammed in a certain frequency band, therefore adjoining signal components cannot be sufficiently isolated. Accordingly, each band pass filter must have a sharp frequency characteristic in order to discriminate between carrier signals of adjoining frequencies.

For example, it is difficult to prepare various types of high precision filters such as comb type filters which have such sharp frequency characteristics. Further, this becomes considerably expensive in terms of price. Therefore, it is difficult to realize this.

FIG. 24 is a view of a second method of demultiplexing a multi-carrier signal.

In FIG. 24, a Fast Fourier transform (FFT) is applied to a signal received at a receiver circuit 22 in a Fast Fourier transform (FFT) circuit 23 to create a received symbol series arranged on the frequency axis. The symbol series is demultiplexed to separate symbols in a demultiplexer (signal demultiplexing apparatus) 29. Due to this, it is possible to select only specific symbols.

In this method, however, even when extracting specific symbols, the fast Fourier transform is applied to all symbols. Therefore, a complex FFT circuit 23 must be provided, so the hardware configuration becomes complex.

FIG. 25 is a schematic view of the configuration when extracting only carrier signal components at constant intervals. In FIG. 25, a plurality of band pass filters having a plurality of different band pass characteristics are provided. Signals limited in bands by the filters are added to each other at adder circuits 28A and 28B to obtain the intended signal. In this case as well, as the band pass filters, for example, comb type filters can be used.

However, in the same way as with the method of FIG. 23, since it is a multi-carrier method, this method also suffers from the disadvantages that carriers are crammed together, so the signal components cannot be sufficiently isolated. Also, it becomes difficult to prepare high precision filters having sharp frequency characteristics from the cost perspective etc.

FIG. 21B is a schematic view of the configuration of a wireless signal receiver in the DAB system illustrated in FIG. 21A.

A wireless receiving apparatus 20 of an ODFM wireless communication system 1 of FIG. 21B has an antenna 21, a receiver circuit 22, a Fast Fourier transform (FFT) circuit 23, a symbol selection circuit 24, a bit extraction circuit 25, and a decoding circuit 26.

By transforming the frequency of the signal of the intended frequency band received at the antenna 21 in the receiver circuit 22 and extracting only the baseband signal component, a baseband signal is obtained. The thus obtained baseband signal is expressed on the time axis of the signal with the information arranged on the frequency axis. Therefore, FFT processing is carried out in the FFT circuit 23 to extract subcarriers arranged on the frequency axis.

At this time, the symbols output by the FFT processing consist of the group of subcarriers of the signal bands received as a whole (for example, in the present example, containing 1152 ksps worth of information).

The symbol selection circuit 24 extracts the symbols from the group of subcarriers from the positions of the symbols of the intended channel arranged by the frequency interleaving at the transmission side illustrated in FIG. 21A. By this, the 64 kbps of information of the intended channel is extracted.

The received bit stream is extracted from among the symbol stream of the intended channel obtained in this way in the bit extraction circuit 25 to obtain the encoded bit stream, then this is decoded at the decoding circuit 26 to obtain the information bit stream of the intended channel.

Summarizing the disadvantages to be solved by the invention, in this way, in OFDM, multiplexing is carried out by allocating symbols of different channels to different subcarriers, but this means that the wireless receiving apparatus 20 receives a multiplexed signal of all channels transmitted and, further, that the FFT circuit 23 extracts the symbols of all of the channels, then the symbol selection circuit 24 selects the channel. Therefore, the FFT circuit 23 performs FFT processing entailing computations far exceeding the amount required for the originally required one channel's worth of information.

Namely, this means that the FFT circuit 23 performs the FFT signal processing for even channels which the wireless receiving apparatus 20 does not desire, so there is a disadvantage in that the FFT circuit 23 becomes unnecessarily large in scale.

As a method of solving this disadvantage, the present inventors have proposed the invention disclosed in for example Japanese laid open patent No. 2000-332722 published on Nov. 30, 2000. In the invention disclosed in Japanese laid open patent No. 2000-332722, circuits for demultiplexing a symbol string for every alternate subcarrier from the symbol series are provided in multiple stages hierarchically by a branching method.

SUMMARY OF THE INVENTION

An object of the present invention is to overcome the disadvantage by a method different from that of the invention disclosed in Japanese laid open patent No. 2000-332722, and to further extract only one symbol with a high efficiency.

Another object of the present invention is to provide a signal component demultiplexing apparatus capable of demultiplexing a symbol series in a branching manner with a high efficiency.

Another object of the present invention is to provide a filter apparatus capable of extracting specific symbols from a symbol series with a high efficiency.

Still another object of the present invention is to provide a receiving apparatus having the signal component demultiplexing apparatus and/or filter circuit.

Still another object of the present invention is to provide a communication system having a receiving apparatus and a transmitting apparatus.

Still another object of the present invention is to provide a communication method for the receiving processing and the transmitting processing.

According to a first aspect of the present invention, there is provided a signal component demultiplexing apparatus for demultiplexing a certain group of signals from among a group of multi-carrier modulated signals (group of symbols), comprising branching circuits connected in stages and hierarchically by a branching method, each branching circuit including a symbol delaying means for delaying an input group of signals by $N/2^{(m+1)}$ symbols, a phase offset adjusting means for shifting the phase of the input group of signals by $-\pi(k/2^m)$ radians with a reference 0 Hz, an adding means for adding an output signal of the symbol delaying means and an output signal of the phase offset adjusting means to calculate one symbol string alternately positioned on a frequency axis in a multiplexed signal input to a signal selecting and outputting means, and a subtracting means for subtracting the output signal of the phase offset adjusting means from the output signal of the symbol delaying means to calculate the other symbol string alternately positioned on the frequency axis in the multiplexed signal input to the signal selecting and outputting means, wherein m is a parameter indicating the position of a stage of the branching circuit, N is the number of symbols existing within one modulation time, and k is a parameter indicating that a group of signals having a frequency offset of a subcarrier is input with a reference 0 Hz.

According to a second aspect of the present invention, there is provided a receiving apparatus, used in multiplex communication based on multi-carrier modulation where subcarriers of a plurality of channels are cyclically arranged, comprising the above signal component demultiplexing apparatus.

The receiving apparatus has a receiving means for receiving a group of signals; a signal component demultiplexing apparatus comprising branching circuits connected in stages and hierarchically by a branching method, each branching circuit provided with a symbol delaying means for delaying an input group of signals by $N/2^{(m+1)}$ symbols, a phase offset adjusting means for shifting the phase of the input group of signals by $-\pi(k/2^m)$ radians with a reference 0 Hz, an adding means for adding an output signal of the symbol delaying means and an output signal of the phase offset adjusting means to calculate one symbol string alternately positioned on a frequency axis in a multiplexed signal input to a signal selecting and outputting means, and a subtracting means for subtracting the output signal of the phase offset adjusting means from the output signal of the symbol delaying means to calculate the other symbol string alternately positioned on the frequency axis in the multiplexed signal input to the signal selecting and outputting means; an orthogonal transforming means for orthogonally transforming the group of signals demultiplexed at the signal component demultiplexing apparatus; and a decoding means for decoding the orthogonally transformed information.

According to a third aspect of the present invention, there is provided a communication apparatus having a transmitting apparatus and the above receiving apparatus in multiplex communication based on multi-carrier modulation where subcarriers of a plurality of channels are cyclically arranged.

The transmitting apparatus of the communication apparatus has an encoding means for independently encoding information of a plurality of channels, a signal point arranging means for arranging signal points by modulating the encoded information based on a predetermined modulation method, a signal multiplexing means for multiplexing the plurality of signal point-arranged signals cyclically on a time axis, an inverse orthogonal transforming means for inversely orthogonally transforming the multiplexed signal, and a transmitting means for transmitting the orthogonally transformed information.

The receiving apparatus of the communication apparatus has the same components as the above receiving apparatus, that is, a receiving means for receiving the transmitted group of signals, a signal component demultiplexing means for selecting and demultiplexing the received group of signals, an orthogonal transforming means for orthogonally transforming the selected and demultiplexed signal, and a decoding means for decoding the orthogonally transformed information.

The signal component demultiplexing means has the above configuration.

Preferably, the signal multiplexing means in the transmitting apparatus multiplexes the plurality of signal point-arranged signals while shifting the frequency for every channel at predetermined subcarriers.

More preferably, the modulation method in the signal point arranging means in the transmitting apparatus uses orthogonal frequency division multiplexing (OFDM).

Still more preferably, the inverse orthogonal transform processing means in the transmitting apparatus performs inverse Fourier transform processing, and the orthogonal transform processing means in the receiver performs Fourier transform processing.

According to a fourth aspect of the present invention, there is provided a communication apparatus used in multiplex communication based on multi-carrier modulation where subcarriers of a plurality of channels are cyclically arranged, comprising a receiving means for receiving a group of signals; a signal component demultiplexing apparatus comprising branching circuits connected in stages and hierarchically by a branching method, each branching circuit provided with a symbol delaying means for delaying an input group of signals by $N/2^{(m+1)}$ symbols, a phase offset adjusting means for shifting the phase of the input group of signals by $-\pi(k/2^m)$ radians with a reference 0 Hz, an adding means for adding an output signal of the symbol delaying means and an output signal of the phase offset adjusting means to calculate one symbol string alternately positioned on a frequency axis in a multiplexed signal input to a signal selecting and outputting means, and a subtracting means for subtracting the output signal of the phase offset adjusting means from the output signal of the symbol delaying means to calculate the other symbol string alternately positioned on the frequency axis in the multiplexed signal input to the signal selecting and outputting means; a signal selecting means for selecting and outputting at least one group of symbols of predetermined subcarriers from among the symbol strings demultiplexed at the signal component demultiplexing apparatus; a frequency offset compensating means for compensating for frequency offset of at least one group of symbols selected and output by the signal selecting means; two orthogonal transforming means for orthogonally transforming output signals of the frequency offset compensating means; and a decoding means for decoding the orthogonally transformed signal.

Preferably, the frequency offset compensating means has a frequency offset compensation signal generating means for outputting a complex sine wave signal for the frequency offset compensation, a multiplying means for multiplying the group of signals and the complex sine wave signal output from the frequency offset compensation signal generating means, and a rearranging means for rearranging symbols as the result of multiplication in the multiplying means along a frequency axis.

According to a fifth aspect of the present invention, there is provided a communication apparatus having a transmitting apparatus and a receiving apparatus of the fourth aspect of the invention used in multiplex communication based on multi-carrier modulation where subcarriers of a plurality of channels are cyclically arranged.

According to a sixth aspect of the present invention, there is provided a receiving apparatus used in multiplex communication based on multi-carrier modulation where subcarriers of a plurality of channels are cyclically arranged, provided with a receiving means for receiving a group of signals; a signal component demultiplexing apparatus for demultiplexing the received group of signals configured by branching circuits connected in stages and hierarchically by a branching method, each branching circuit including a symbol delaying means for delaying an input group of signals by $N/2^{(m+1)}$ symbols, a phase offset adjusting means for shifting the phase of the input group of signals by $-\pi(k/2^m)$ radians, an adding means for adding an output signal of the symbol delaying means and an output signal of the phase offset adjusting means to calculate one symbol string alternately positioned on a frequency axis in a multiplexed signal input to a signal selecting and outputting means, and a subtracting means for subtracting the output signal of the phase offset adjusting means from the output signal of the symbol delaying means to calculate the other symbol string alternately positioned on the frequency axis in the multiplexed signal input to the signal selecting and outputting means; a frequency offset compensating means for compensating for frequency offset of at least one group of symbols selected and output by the signal selecting means; two orthogonal transforming means for orthogonally transforming output signals of the frequency offset compensating means; and a decoding means for decoding the orthogonally transformed signals.

According to a seventh aspect of the present invention, there is provided a communication apparatus and the above receiving apparatus used in multiplex communication based on multi-carrier modulation where subcarriers of a plurality of channels are cyclically arranged.

According to an eighth aspect of the present invention, there is provided a filter apparatus for extracting a specific signal from a group of multi-carrier modulated signals, including a signal component demultiplexing apparatus comprising branching circuits connected in stages and hierarchically by a branching method, each branching circuit including a symbol delaying means for delaying an input group of signals by $N/2^{(m+1)}$ symbols, a phase offset adjusting means for shifting the phase of the input group of signals by $-\pi(k/2^m)$ radians with a reference 0 Hz, an adding means for adding an output signal of the symbol delaying means and an output signal of the phase offset adjusting means to calculate one symbol string alternately positioned on a frequency axis in a multiplexed signal input to a signal selecting and outputting means, and a subtracting means for subtracting the output signal of the phase offset adjusting means from the output signal of the symbol delaying means to calculate the other symbol string alternately positioned on the frequency axis in the multiplexed signal input to the signal selecting and outputting means; a signal selecting means for selecting and outputting a group of symbols of a specific subcarrier from among the symbol strings demultiplexed at the signal component demultiplexing apparatus; and a frequency offset compensating means for compensating for frequency offset of the group of symbols selected and output by the signal selecting means.

According to a ninth aspect of the present invention, there is provided a receiving apparatus used in multiplex communication based on multi-carrier modulation where subcarriers of a plurality of channels are cyclically arranged, including a receiving means for receiving a group of multi-carrier modulated signals; the above filter apparatus for extracting a specific signal from the group of multi-carrier modulated signals received at the receiving means; an orthogonal transforming means for orthogonally transforming the signal extracted at the filter apparatus; and a decoding means for decoding the orthogonally transformed signal.

According to a 10th aspect of the present invention, there is provided a filter apparatus for extracting a specific signal from a group of multi-carrier modulated signals, provided with a subcarrier selecting means for selecting a subcarrier, at least one signal selecting means for selecting and outputting a specific group of signals from among the input group of signals in accordance with the selected subcarrier, and a frequency offset compensating means for compensating the frequency offset of a signal selected by the signal selecting means.

According to an 11th aspect of the present invention, there is provided a receiving apparatus used in multiplex communication based on multi-carrier modulation where subcarriers of a plurality of channels are cyclically arranged, provided with a receiving means for receiving a group of multi-carrier modulated signals, the above filter apparatus for extracting a specific signal from the group of multi-carrier modulated signals received at the receiving means, an orthogonal transforming means for orthogonally transforming the signal extracted at the filter apparatus, and a decoding means for decoding the orthogonally transformed signal.

According to a 12th aspect of the present invention, there is provided a filter apparatus for extracting a specific signal from a group of multi-carrier modulated signals, including a pass subcarrier selection signal outputting means for outputting a complex sine wave signal in accordance with a channel to be selected, a multiplying means for multiplying a complex sine wave signal output from the pass subcarrier selection signal outputting means and the input group of signals, at least one signal component demultiplexing means for selecting a specific group of signals from the results of multiplication in the multiplying means, and a symbol rearranging means for rearranging the output of the signal component demultiplexing apparatus on the frequency axis.

According to a 13th aspect of the present invention, there is provided a receiving apparatus used in multiplex communication based on multi-carrier modulation where subcarriers of a plurality of channels are cyclically arranged, including a receiving means for receiving a group of multi-carrier modulated signals, the above filter apparatus for extracting a specific signal from the group of multi-carrier modulated signals received at the receiving means, an orthogonal transforming means for orthogonally transforming the signal extracted at the filter apparatus, and a decoding means for decoding the orthogonally transformed signal.

According to a 14th aspect of the present invention, there is provided a receiving apparatus used in multiplex communication based on multi-carrier modulation where a plurality of channels of subcarriers are cyclically arranged, provided with a receiving means for receiving a group of multi-carrier modulated signals; a switching means for switching the input group of signals; a buffer means for holding the group of multi-carrier modulated signals received at the receiving means; a filter apparatus connected after the switching means and for selecting and outputting a specific group of signals from the input group of signals; an orthogonal transforming means for orthogonally transforming the signals extracted at the filter apparatus; and a decoding means for decoding the orthogonally transformed signals, wherein the switching means outputs one symbol's worth of the group of signals to the filter apparatus, and the buffer means holds the input one symbol's worth of the group of signals during that time and transmits the group of signals held at the buffer means via the switching means to the filter apparatus after the end of transmitting the signals to the filter apparatus and the filter apparatus selects and outputs only a designated subcarrier from the group of signals input via the switching means.

As the filter apparatus, use can be made of the above various filter apparatuses.

According to a 15th aspect of the present invention, there is provided a receiving apparatus used in multiplex communication based on multi-carrier modulation where a plurality of channels of the subcarriers are cyclically arranged, provided with a receiving means for receiving a group of multi-carrier modulated signals; a first filter apparatus for selecting and outputting a group of signals of even number carriers from a group of multi-carrier modulated signals received at the receiving means; a second filter apparatus for selecting and outputting a group of signals of odd number carriers from a group of multi-carrier modulated signals received at the receiving means; a buffer means for holding the output group of signals of the second filter apparatus; a switching means for switching the output group of signals of the first filter apparatus; an orthogonal transforming means connected after the switching means and orthogonally transforming the switched output signals; and a decoding means for decoding the orthogonally transformed signals, wherein the switching means transmits the output signals of the first filter apparatus to the orthogonal transforming means and transmits the group of signals held at the buffer means via the switching means to the orthogonal transforming means after the end of transmitting the signals to the orthogonal transforming means.

As the filter apparatus, use can be made of the above various filter apparatuses.

According to a 16th aspect of the present invention, there is provided a communication method comprising an encoding and transmitting step of independently encoding information of a plurality of channels, arranging signal points by modulating the encoded information based on a predetermined modulation method, multiplexing the plurality of signal point-arranged signals cyclically on a time axis, inversely orthogonally transforming the multiplexed signal, and transmitting the orthogonally transformed information and a receiving and decoding step of receiving the transmitted signal, selecting and outputting only the signal of an intended channel from among the received multiplexed signal after the orthogonal transformation, orthogonally transforming the selected and output signal, and decoding the orthogonally transformed information, wherein the signal selection processing in the receiving step comprises giving a delay of $N/2^{(m+1)}$ symbols, shifting the phase by exactly $\pi(k/2^m)$ radians, and performing branched and in stages the procedure of adding the symbol delayed signal and the phase shifted signal to calculate one symbol string alternately located on the frequency axis in the input multiplexed signal or subtracting the phase shifted signal from the symbol delayed signal to calculate the other symbol string alternately located on the frequency axis in the input multiplexed signal.

BRIEF DESCRIPTION OF THE DRAWINGS

The above objects and features of the present invention will be more apparent from the following description of the preferred embodiments given with reference to the accompanying drawings, in which:

FIGS. 1A and 1B are views of the configuration of a communication system, a transmitting apparatus, and a receiving apparatus of the present invention and a digital wireless communication system used for example for a DAB system using OFDM as a multi-carrier modulation method according to an embodiment of a communication method, in which FIG. 1A is a view of the configuration of the transmitting apparatus of an OFDM wireless communication system and FIG. 1B is a view of the configuration of the receiving apparatus of an OFDM wireless communication system;

FIGS. 2A to 2C are graphs showing processing of the transmitting apparatus illustrated in FIG. 1A, in which, FIG. 2A shows symbol streams independent for each channel, FIG. 2B is a schematic view of the configuration of a multiplexer illustrated in FIG. 1A, and FIG. 2C is a graph showing a multi-carrier modulated signal;

FIGS. 21A and 21B are views of examples of the configuration of the digital wireless communication system using OFDM applied to the DAB system or the like as the multi-carrier modulation method, in which, FIG. 21A is a view of the configuration of the transmitting apparatus and FIG. 21B is a view of the configuration of the receiving apparatus;

DETAILED DESCRIPTION

Figure 2B:
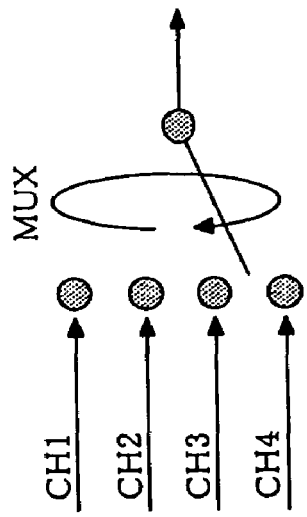

Preferred embodiments of the communication apparatus (communication system), transmitting apparatus (transmitter) and receiving apparatus (receiver), and communication method of the present invention will be explained by referring to the attached drawings.

In the following embodiments, a wireless communication system will be described as the communication system, but the present invention is not limited to a wireless communication system and can also be applied to a wired communication system. However, in the following embodiments, the communication system will be illustrated using an orthogonal frequency division multiplexing (OFDM) method suitable for a wireless communication system, for example, the DAB system.

First Embodiment of Communication Apparatus

A first embodiment of the communication system, transmitting apparatus, receiving apparatus, and communication method of the present invention will be explained next by referring to FIGS. 1A and 1B, FIGS. 2A to 2C, and FIG. 3.

FIGS. 1A and 1B are views of the configuration of a digital wireless communication system using OFDM as the multi-carrier modulation method as a first embodiment of the communication system, transmitting apparatus, receiving apparatus, and communication method of the present invention, in which FIG. 1A is a view of the configuration of a transmitting apparatus 30 of an OFDM wireless communication system, and FIG. 1B is a view of the configuration of a receiving apparatus 40 of the OFDM wireless communication system.

The transmitting apparatus 30 and the receiving apparatus 40 configure an OFDM wireless communication system.

Transmitting Apparatus (Transmitter) 30

The transmitting apparatus (transmitter) 30 will be explained first.

The transmitting apparatus 30 of the OFDM wireless communication system illustrated in FIG. 1A has a first channel encoder circuit $31_1$, and a first channel symbol mapping circuit $32_1$, a second channel encoder circuit $31_2$ and a second channel symbol mapping circuit $32_2$, ..., and an Mth channel encoder circuit $31_M$ and an Mth channel symbol mapping circuit $32_M$. This example shows the case where information bit streams of M number of channels are encoded.

The transmitting apparatus 30 further has a multiplexer (signal multiplexing circuit) 34, a scrambling, IFFT, guard time adding, and window processing circuit 36, a transmitter circuit 38, and an antenna 39.

The transmitting apparatus 30 has one set of the multiplexer 34, scrambling, IFFT, guard time adding, and window processing circuit 36, and transmitter circuit 38 with respect to the plurality of encoder circuits $31_1$ to $31_M$ and the plurality of symbol mapping circuits $32_1$, to $32_M$. The same number of encoder circuits 31 and symbol mapping circuits 32 are provided as the number of channels.

The encoding, interleaving, and other processing are independently carried out in the encoder circuits $31_1$ to $31_M$ for the independent information bit streams of channel 1 to channel M.

A concrete example of the encoding in the encoder circuits $31_1$ to $31_M$ will be explained next. Where an OFDM wireless communication system is applied to the transmission of an audio signal of, for example, the DAB system, since the bit signals of the information bit streams are audio signals, the encoder circuits $31_1$ to $31_M$ encode audio signals. The encoder circuits $31_1$ to $31_M$ also interleave the signals according to need.

The encoded bit signals of the channels created at the encoder circuits $31_1$ to $31_M$ are mapped to transmission symbols in the symbol mapping circuits $32_1$ to $32_M$, whereby the symbol streams are created.

The symbol mapping circuits $32_1$ to $32_M$ can apply various types of modulation methods used for OFDM. As such modulation methods, multi-value QAM, PSK, various other types of modulation methods can be applied.

Figure 2A:
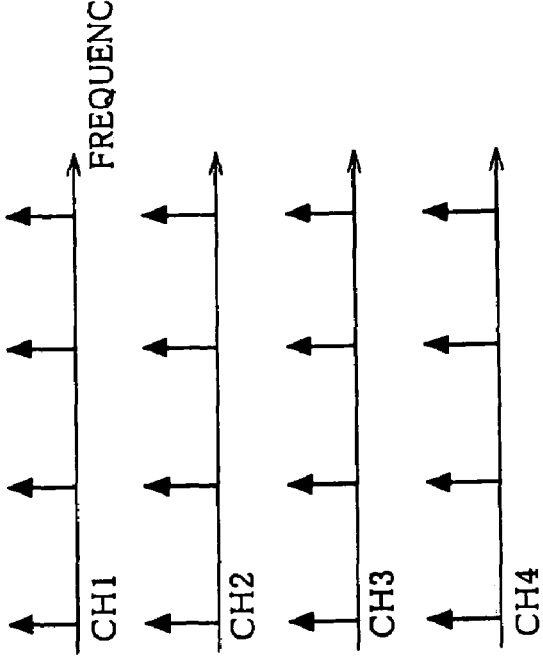

In this way, the symbol mapping circuits $32_1$ to $32_M$, as illustrated in FIG. 2A, create independent symbol streams for each channel.

Figure 2C:
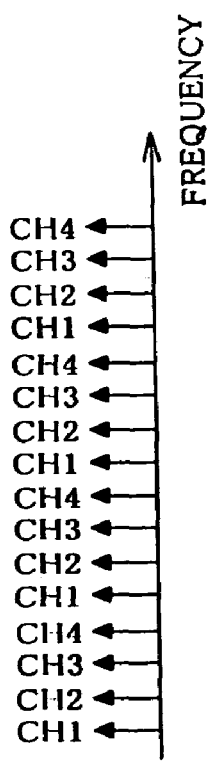

The symbol streams for the plurality of channels are multiplexed at the multiplexer 34 to create a multiplexed symbol stream. The multiplexer 34 has the switch circuit illustrated in FIG. 2B. Due to the multiplexing of the multiplexer 34, the symbols of the plurality of channels illustrated in FIG. 2A become the multiplexed symbol stream comprised of the symbols of the plurality of channels arranged on the frequency axis as illustrated in FIG. 2C.

The multiplexed symbol stream multiplexed at the multiplexer 34 is scrambled by random phase shifting (RPS), random orthogonal transform (ROT), etc. in the scrambling, IFFT, guard time adding, and window processing circuit 36.

The scrambling, IFFT, guard time adding, and window processing circuit 36 transforms the frequency domain multiplexed symbol stream to a multiplexed symbol stream of the time domain by an inverse Fourier fast transform (IFFT).

Further, the addition of the guard time and the window processing are applied to it in the scrambling, IFFT, guard time adding, and window processing circuit 36.

The scrambling, IFFT, guard time adding, and window processing circuit 36 is shown as a single means for scrambling, inverse Fast Fourier transform (IFFT), guard time processing, window processing, etc. explained later. This processing may also be processed separately by individual circuits or individual means.

The scrambling, guard time processing and the window processing in the scrambling, IFFT, guard time adding, and window processing circuit 36 are not indispensable to the present invention. However, if the signal is scrambled, the privacy (secrecy) of the communication is raised.

As a representative example of the orthogonal transformation, IFFT was illustrated, but it is also possible to apply other orthogonal transforms, for example, inverse discrete cosine transform (IDCT), in place of IFFT in the scrambling, IFFT, guard time adding, and window processing circuit 36.

From the above description, the scrambling, IFFT, guard time adding, and window processing circuit 36 is a circuit or means for applying an orthogonal transform.

The output symbols of the scrambling, IFFT, guard time adding, and window processing circuit 36 are convoluted with the high frequency signal in the transmitter circuit 38 and to be transformed to the intended frequency band, then transmitted into the air via the antenna 39.

Next, an explanation will be made of the configuration of an internal portion of the multiplexer 34 and the arrangement of the symbols of the channels created by this multiplexing method by referring to FIGS. 2A to 2C.

FIGS. 2A to 2C are views showing a basic concept of the multiplexed transmission in the multiplexer 34 illustrated in FIG. 1.

The multiplexer 34 illustrated in FIG. 1A is basically configured as the switching circuit illustrated in FIG. 2B.

FIG. 2A shows the symbol streams of channels multiplexed at the multiplexer 34. Here, four channels from channel 1 (CH1) to channel 4 (CH4) are illustrated. The symbol streams of the channels are individually inserted in the multiplexer 34.

FIG. 2B is a view showing the concept of the processing in the multiplexer 34. The input symbol streams of the channels are cyclically switched and the symbols arranged so that the symbols of each channel cyclically appear. The multiplexed symbol stream is shown in FIG. 2C.

In this example, the case of multiplexing a maximum of four channels is taken as an example, so the symbols of each channel appear at a cycle of 4, but the maximum number of channels multiplexed is not limited to this. It is also possible to set the number at $2^n$ (n=1, 2, 3, 4, ...) for any whole number n. The cycle at which the symbols of each channel appear in this case becomes $2^n$ or the same as the maximum number of channels multiplexed.

When the multiplexing in the multiplexer 34 is the processing of $2^2$ channels, when the number of the channels actually used for communication is smaller than the maximum number of channels multiplexed, a null symbol having an amplitude of "0 (zero)" is inserted as a symbol of an unused channel for the cyclic multiplexing in the multiplexer 34.

Figure 3:
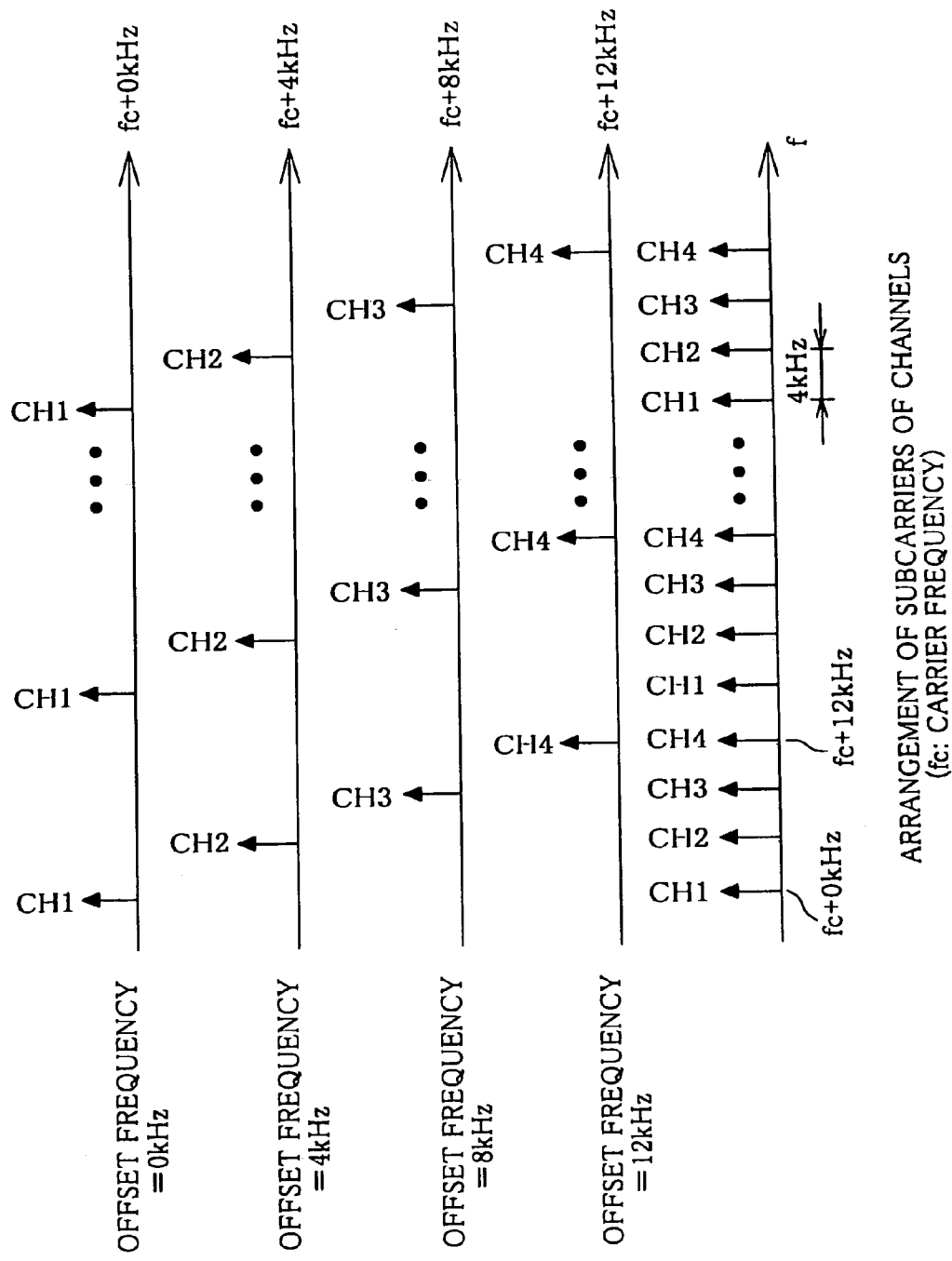
FIG. 3 is a graph showing an arrangement of subcarriers of a plurality of channels modulated by the transmitting apparatus of FIG. 1A.

FIG. 3 is a view of the arrangement of the subcarriers of a plurality of channels.

In the example illustrated in FIG. 3, the case where there are four channels and performing OFDM processing with a subcarrier interval of 4 kHz for every channel, that is, the case of the 250 μs=¼ kHz for modulation of one symbol, is illustrated. While the interval between subcarriers of the multiplexed signal is 4 kHz, the channel 1 to channel 4 cyclically appear on the frequency axis in units of subcarriers, therefore the subcarrier of each channel appears at intervals of 16 kHz=4×4 kHz.

The symbol $f_c$ in FIG. 3 indicates a carrier (carrier) frequency (center frequency of a band signal).

In the embodiment of the present invention, in multiplexed communication by multi-carrier modulation, subcarriers of a plurality of channels are cyclically arranged. This is to facilitate the modulation of a large number of symbols and further to facilitate channel demultiplexing in a channel selection circuit 43 in the receiving apparatus 40 explained later.

First Embodiment of Receiving Apparatus

The receiving apparatus 40 of the OFDM wireless communication system illustrated in FIG. 1B will be explained next.

In this embodiment, similar to the transmitting apparatus 30, the case where there are four multiplexed channels and performing OFDM processing with a subcarrier interval of 4 kHz for every channel, that is, the case of the 250 μs=¼ kHz for modulation of one symbol, is illustrated. Further, for convenience of the explanation, a case where the signal band of the multiplexed signal is 1024 kHz and there are 256 subcarriers is illustrated. This corresponds to the case where there are 64(=256/4) subcarriers per channel.

The receiving apparatus 40 has a receiving antenna 41, a high frequency receiver circuit 42, a signal component demultiplexing apparatus (demultiplexer or channel selection circuit) 43, an FFT and/or descrambling means 44, a bit extraction circuit 45, and a decoding circuit 46.

The signal transmitted from the transmitting apparatus 30 of the OFDM wireless communication system is received at the receiving antenna 41 and down converted to the baseband area in the high frequency receiver circuit 42. Further, it is converted to a digital signal at a not illustrated A/D converter and input from a connection line 202 to the signal component demultiplexing apparatus 43.

The signal component demultiplexing apparatus 43 receives as input signals of channel 1 to channel 4 arranged on the frequency axis in terms of expression on the time axis.

The signal component demultiplexing apparatus 43 demultiplexes a signal for every plurality of channels inverse to the processing of the demultiplexer 34 in the transmitting apparatus 30.

The detailed circuit configuration and processing method of this signal component demultiplexing apparatus 43 will be explained later by referring to FIG. 4 to FIG. 7.

The number of symbols input from the high frequency receiver circuit 42 to the signal component demultiplexing apparatus 43 is 256 per modulation time (an over sample is not considered here for simplification), but the number of he subcarriers of the intended channel is ¼, therefore the channel selection circuit 43 performs decimation on the frequency axis and outputs 64(=256/4) symbols. Due to this, the number of symbols of the FFT processing in the FFT and/or descrambling means 44 is decreased to ¼.

The output symbols of the signal component demultiplexing apparatus 43 are input via a signal line 204 to the FFT and/or descrambling means 44.

The FFT and/or descrambling means 44 applies a fast Fourier transform (FFT) inverse to the IFFT (inverse fast Fourier transform) in the scrambling, IFFT, guard time adding, and window processing circuit 36 in the transmitting apparatus 30 to extract the symbol strings arranged on the frequency axis.

The signal component demultiplexing apparatus 43 selects and extracts the symbols of intended channel and applies them to the FFT and/or descrambling means 44. Therefore, the symbols extracted by the FFT processing do not include the symbols of channels other than the intended channel. Namely, the processing in the processing means 44 need only be the FFT processing having the minimum number of points required for receiving the intended channel. As a result, the FFT processing circuit in the FFT and/or descrambling means 44 becomes small in scale.

The symbol stream of the intended channel extracted in this way is subjected to processing corresponding to the random phase shifting, random orthogonal transform processing, and other processing in the scrambling, IFFT, guard time adding, and window processing circuit 36, descrambled in the transmitting apparatus 30, and then input through the signal line 206 to the bit extraction circuit 45.

The bit extraction circuit 45 extracts the bits in accordance with the modulation method by which the symbols were modulated and applies the encoded bit stream to the decoding circuit 46. As such a modulation method, various modulation methods such as the QPSK, 8PSK, and 16QAM applied in OFDM can be applied.

The decoding circuit 46 extracts the information bit stream by deinterleaving and decoding reverse to the encoding and the interleaving carried out in the encoder circuits to $31_1$ to $31_M$ of the plurality of channels in the transmitting apparatus.

By providing the signal component demultiplexing apparatus 43 in a receiving apparatus 40 receiving signals of the symbol strings of a large number of subcarriers, it becomes possible to perform the processing after lowering (decimating) the sample rates in the FFT and descrambling means 44, bit extraction circuit 45, and decoding circuit 46 to that of the intended channel and it becomes possible to greatly reduce amounts of processing of the circuits 45 to 46 after the FFT and descrambling means 44 to, for example, (1/number of multiplexed channels).

Particularly, since the signal component demultiplexing apparatus 43 is provided in front of the FFT and descrambling means 44 and the amount of data of the FFT processing in the FFT and/or descrambling means 44 is decreased, the memory capacity for the FFT processing becomes small. This contributes a large degree to the reduction of scale of the receiving apparatus 40. Further, the FFT processing time in the FFT and/or descrambling means 44 can be shortened.

The subcarrier of each channel is arranged over the entire frequency band of the system. Therefore when the present embodiment is applied to a wireless communication system with a large number of multiplexed channels like the DAB system, a large frequency diversity effect can be expected. By this, it becomes possible to suppress deterioration of the quality of service due to fading.

Signal Component Demultiplexing Apparatus 43

An embodiment of the signal component demultiplexing apparatus 43 shown in FIG. 1B will be explained next by referring to FIG. 4 to FIG. 7.

Figure 4:
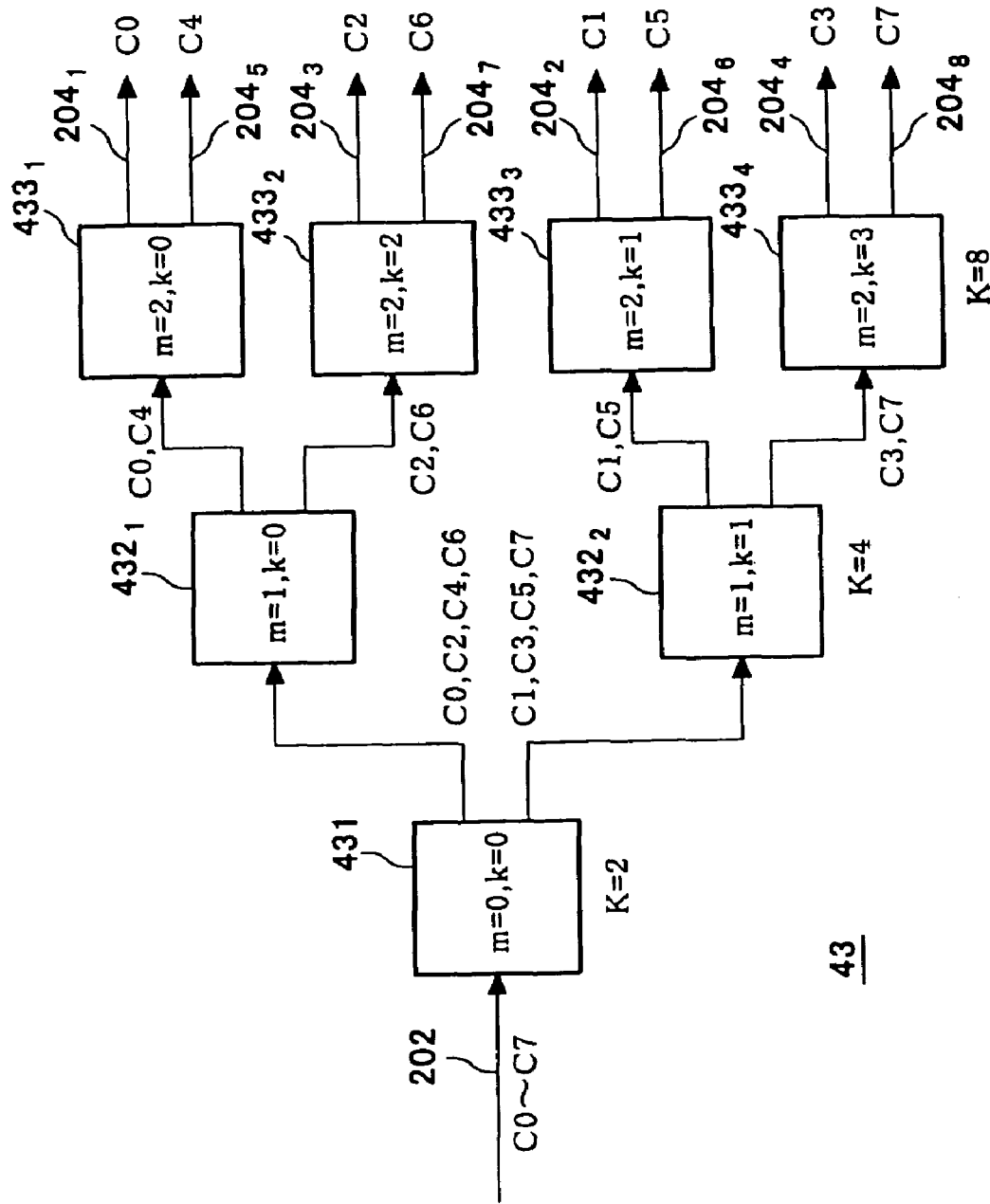
FIG. 4 is a view of the configuration of a signal component demultiplexing apparatus illustrated in FIG. 1B.

FIG. 4 is a view of the configuration of the signal component demultiplexing apparatus 43.

Figure 5:
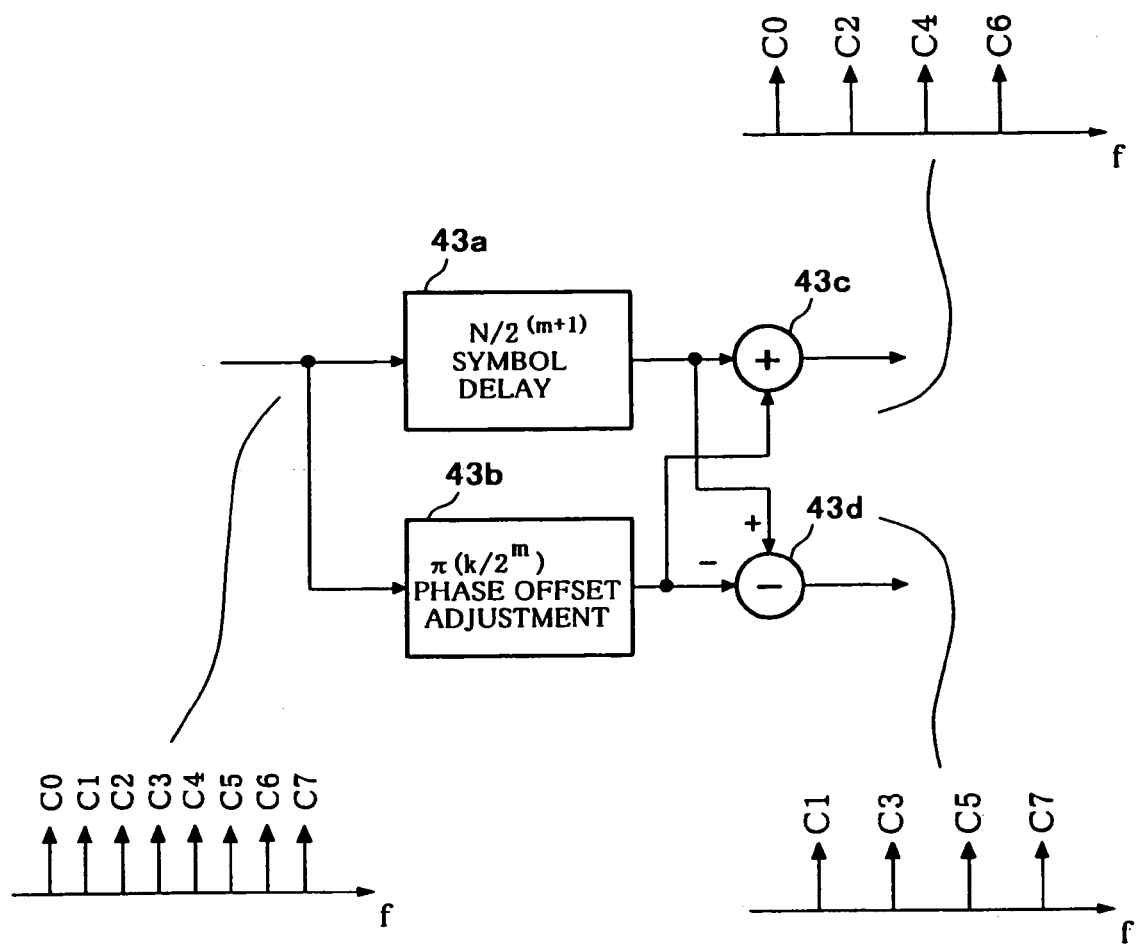
FIG. 5 is a view of the configuration of a branching circuit configuring part of the signal component demultiplexing apparatus illustrated in FIG. 4.

FIG. 5 is a circuit diagram of a branching circuit forming part of the signal component demultiplexing apparatus 43 illustrated in FIG. 4.

Figure 6:
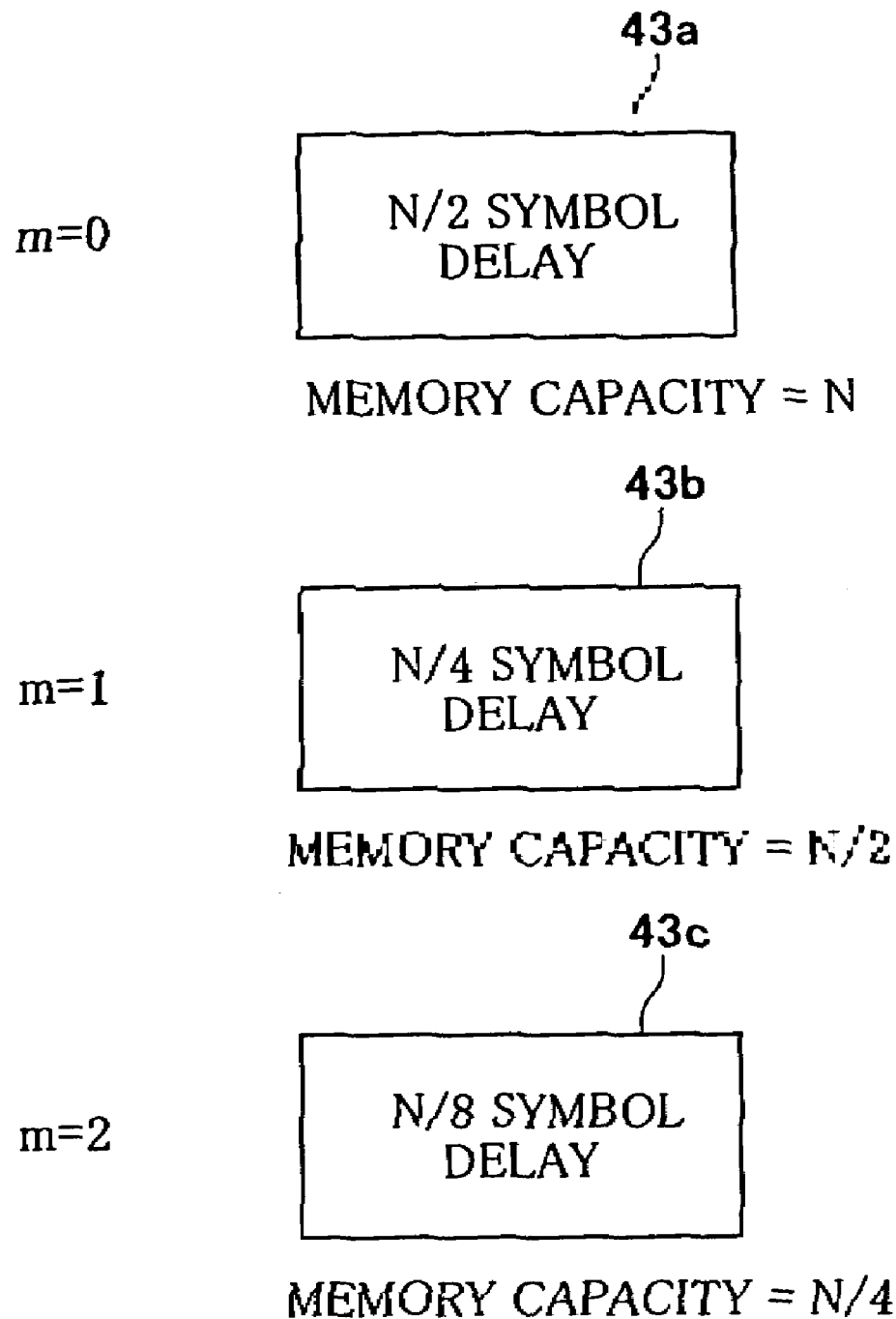
FIG. 6 is a view of an aspect of a symbol delay circuit illustrated in FIG. 5.

FIG. 6 is a view of an example of a symbol delay circuit 43a illustrated in FIG. 5.

Figure 7:
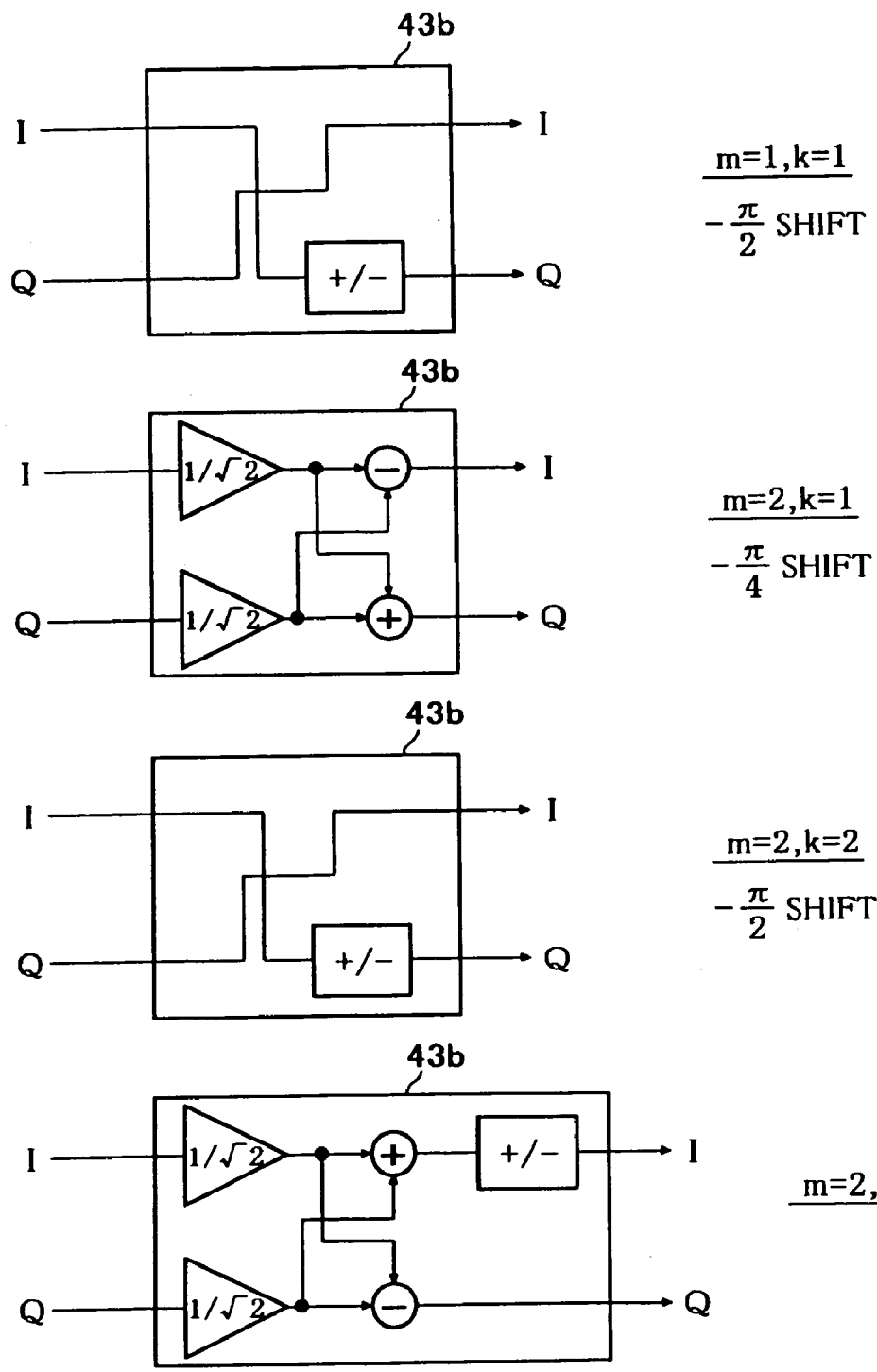
FIG. 7 is a view of an embodiment of a phase offset adjustment circuit illustrated in FIG. 5.

FIG. 7 is a view of an example of a phase offset adjustment circuit 43b illustrated in FIG. 5.

In the present embodiment, a case where there are subcarriers of $2^3$ channels=8 channels C0 to C7 will be explained.

The signal component demultiplexing apparatus 43 illustrated in FIG. 4 has one first stage branching circuit 431, two second stage branching circuits $432_1$ and $432_2$, and four third stage branching circuits $433_1$ to $433_4$. The circuit configuration of the signal component demultiplexing apparatus 43 is designed so that the branching circuits $431{:}432_1$, $432_2{:}433_1$ to $433_4$ for sequentially branching the symbols fan out in the form of a power of 2 (or hierarchically like a hierarchy (pyramid) in the form of a power of 2).

The branching circuit is significant in the extraction of the symbol strings alternately branched to two systems for every subcarrier when the symbol strings are input.

It is possible to configure the signal component demultiplexing apparatus 43 by combining individual branching circuits 431, $432_1$, $432_2$, and $433_1$ to $433_4$ as illustrated in FIG. 4. It is also possible to configure these branching circuits by one digital signal processor (DSP). Below, a description will be made of a case where the branching circuits are individually provided and then combined.

The meanings of the symbols in FIG. 4 will be explained next.

The symbol N indicates the number of sample points per modulation time of the symbol series output from the high frequency receiver circuit 42 and received at the signal component demultiplexing apparatus 43.

The symbol K (capital letter) indicates the number of symbols to be demultiplexed in the branching circuit of each stage of the inside of the signal component demultiplexing apparatus 43. The first stage branching circuit 431 demultiplexes the symbols to two symbol strings, so K=2 in that case. The second stage branching circuits $432_M$ and $432_2$ demultiplex the symbols to four symbol strings, so K=4. The third stage branching circuits $433_1$ to $433_4$ demultiplex the symbols to eight symbol strings, so K=8.

The symbol m indicates the position of the stage of the branching circuit. The first stage m is designated as 0.

The symbol k (small letter) is a parameter indicating how many subcarriers worth of frequency offset are possessed by a group of signals input to the branching circuit as compared with a reference 0 Hz.

Each branching circuit can be expressed by using the parameters (m, k). The concrete meanings thereof will be explained by referring to FIG. 5.

The signal component demultiplexing apparatus 43 demultiplexes a multi-carrier digital signal (multi-carrier multiplex signal) of the baseband area output from the high frequency receiver circuit 42 into units of subcarriers.

The symbol strings received at the high frequency receiver circuit 42 are cyclically arranged, so the signal component demultiplexing apparatus 43 demultiplexes the received signal to $2^c$ at intervals of $2^c$ carriers. c is any integer. $2^c$ becomes equal to 2, 4, 8, 16, . . . .

FIG. 5 shows a general circuit configuration of the branching circuit illustrated in FIG. 4.

The branching circuit is configured by a symbol delay circuit 43a, a phase offset adjustment circuit 43b, an adder circuit 43c, and a subtractor circuit 43d.

m stages of symbol delay circuits 43a have a memory capacity of the number of symbols input to the symbol delay circuits 43a and delay the input symbol series by exactly the number of symbols $N/(2^{(m+1)})$. The number m of stages is made 0 for the first stage. The symbol delay circuits 43a delay the N symbols in one modulation time by $(2^{(m+1)})$ symbols.

The symbol delay circuits 43a can be configured by for example a first-in first-out (FIFO) memory, usual random access memory, or the like.

The amounts of the delays of the symbol delay circuits 43a for m=0 to m=3 are illustrated in FIG. 6.

When a symbol series of eight channels C0 to C7 is input to the first stage branching circuit 431 illustrated in FIG. 5 from the high frequency receiver circuit 42, since m=0 and $2^{(m+1)}$=2, the symbol delay circuit 43a of the first stage branching circuit 431 delays the symbol by exactly a half of the number of symbols N.

Similarly, each of the symbol delay circuits 43a in the second stage branching circuits $432_1$ and $432_2$ has a memory capacity of a half of the symbol delay circuit 43a of the first stage branching circuit 431 and delays the symbols by exactly the number of symbols N/4.

Each of the symbol delay circuits 43a in the third stage branching circuits $433_1$ to $433_4$ has a memory capacity of ¼ of the symbol delay circuit 43a of the first stage branching circuit 431 and delays the symbols by exactly the number of symbols N/8.

In each branching circuit of the different stages, the number of the symbols output becomes half of the number of the input symbols. This is equivalent to decimation. The number of symbols input to a later stage branching circuit becomes half of the number of symbols input to a former stage branching circuit. Also, the memory capacity of the symbol delay circuit 43a becomes half of that of the former stage to the latter stage.

The m stages of phase offset adjustment circuits 43b shift the phases of the input symbols (offset the phase) by exactly $-\pi(k/(2^m))$ (radians).

As illustrated in FIG. 3, there is a frequency offset with a reference 0 Hz due to the group of subcarriers. Therefore, the phase offset adjustment circuit 43b shifts the phase for adjusting the rotation of the phase occurring due to this offset. The amount of phase shift is an angle of an amount in accordance with k (small letter) showing the frequency offset of the amount of subcarriers with a reference 0 Hz and the number of stages m, that is, $-\pi(k/(2^m))$ (radians).

The states of phase shift of the phase offset adjustment circuit 43b for various parameters m and k are illustrated in FIG. 7.

The phase offset adjustment circuit 43b in the first stage branching circuit 431 does not rotate the phase since the parameters are m=0 and k (small letter)=0.

The phase offset adjustment circuit 43b in the second stage branching circuit $432_1$ does not rotate the phase in the same way as the phase offset adjustment circuit 43b in the first stage branching circuit 431 since the parameters are m=1 and k=1.

However, the phase offset adjustment circuit 43b of the second stage branching circuit $432_2$ rotates the phase by exactly $-\pi/2$ (radian) since the parameters are m=1 and k (small letter)=1. This phase rotation means that the I-axis and the Q-axis are switched and the polarities are inverted as illustrated. The rotation of the phase of the symbols is achieved just by inverting the polarity of the signal or the switching of the I-axis and the Q-axis at the time of a multiple of $\pi/2$.

The phase offset adjustment circuit 43b of each of the third stage branching circuits $433_1$ to $433_4$ shifts the phase as illustrated for the parameters m=2 and k (small letter)=1 to 3. It does not shift the phase when k=0.

In this way, the phase shift by the phase offset adjustment circuit 43b in a branching circuit can be realized by the inversion of the polarity, addition and subtraction, and multiplication by a coefficient.

The operation of the branching circuit illustrated in FIG. 5 will be explained next.

The branching circuit is a circuit for alternately demultiplexing the input signal and decimating the symbol strings on the frequency axis.

As illustrated in FIG. 5, when the signal strings (group of subcarriers) of the subcarriers C0, C1, C2, C3, to C7 of eight channels are input to the first stage branching circuit 431, if the symbols delayed by exactly the number of symbols (N/2) in the symbol delay circuit 43a and the symbol string not shifted in phase in the phase offset adjustment circuit 43b since k=0 are added at the adder circuit 43c, only the symbol strings of the subcarriers C0, C2, C4, and C6 are demultiplexed and extracted.

If the subtractor circuit 43d subtracts the symbol string not shifted in phase in the phase offset adjustment circuit 43b from the symbols delayed by exactly the number of symbols N/2 in the symbol delay circuit 43a, only the symbol strings of the subcarriers C1, C3, C5 and C7 are demultiplexed and extracted. In this way, the first stage branching circuit 431 demultiplexes the symbol series for every input alternate subcarrier.

The demultiplexed symbol series is decimated to half the resolution on the frequency axis, so the number of the output symbols becomes N/2 symbols for both outputs.

When the subcarriers C0, C2, C4, and C6 are input to the second stage branching circuit $432_1$, if the symbols delayed in the symbol delay circuit 43a by exactly the number of symbols N/4 and the symbol string not rotated in phase in the phase offset adjustment circuit 43b since k=0 are added at the adder circuit 43c, the symbol series of the subcarriers C0 and C4 is extracted.

If the subtractor circuit 43d of the branching circuit $432_1$ subtracts the symbol string not rotated in phase in the phase offset adjustment circuit 43b from the symbols delayed by exactly the number of symbols N/4 in the symbol delay circuit 43a, the symbol series of the subcarriers C2 and C67 is extracted.

In this way, the second stage branching circuit $431_1$ also alternately demultiplexes the input subcarriers and outputs the symbol series. The demultiplexed symbol series becomes half the resolution on the frequency axis and is decimated.

Note that the memory capacity of the symbol delay circuit 43a in the second stage branching circuit $432_1$ is half of the memory capacity of the symbol delay circuit 43a in the first stage branching circuit 431.

When the subcarriers C1, C3, C5, and C7 are input to the second stage branching circuit $432_2$, if the symbols delayed by exactly N/4 (sampling time) in the symbol delay circuit 43a and the symbol string shifted in phase by exactly $-\pi/2$ (radian) in the phase offset adjustment circuit 43b since k=1 and m=1 are added at the adder circuit 43c, the symbol series of the subcarriers C1 and C5 are extracted.

If the subtractor circuit 43d of the branching circuit $432_1$ subtracts the symbol string shifted in phase by exactly $-\pi/2$ (radian) in the phase offset adjustment circuit 43b from the symbols delayed by exactly N/4 in the symbol delay circuit 43a, the symbol series of the subcarriers C3 and C7 is extracted.

In this way, the second stage branching circuit $431_2$ also extracts the symbol series obtained by alternately demultiplexing the input subcarriers. The demultiplexed symbol series becomes half the resolution on the frequency axis and is decimated.

Note that the memory capacity of the symbol delay circuit $43_a$ in a second stage branching circuit $432_2$ is half of the memory capacity of the symbol delay circuit 43a in the first stage branching circuit 431.

The third stage branching circuits $433_1$ to $433_4$ also demultiplex and decimate the symbols.

As a result, finally the symbols of the channels C0, C4, C2, C6, C1, C5, C3, and C7 are demultiplexed and output from the output lines of the third stage branching circuits $433_1$ to $433_4$.

These symbols demultiplexed to the symbols for every subcarrier are corrected for their frequency offsets through for example a frequency offset compensation circuit (frequency offset compensating and/or eliminating means) explained later by referring to FIG. 8, and then applied to the FFT and/or descrambling means 44 illustrated in FIG. 1B. The operation after the FFT and/or descrambling means 44 was explained before.

The FFT and/or descrambling means 44 receives as input a signal reduced in resolution on the frequency axis, so the circuit configuration of the FFT and/or descrambling means 44 becomes simple.

According to the signal component demultiplexing apparatus 43 configured by combining branching circuits hierarchically in this way, the symbols are alternately demultiplexed for every input subcarrier at each stage and, at the same time, the resolutions of the signal components on the frequency axis can be successively lowered (decimated) to ½.

The branching circuits configuring the units of the signal component demultiplexing apparatus 43 basically have the same circuit configurations except that the memory capacities of the symbol delay circuits 43a successively become halved from the first stage toward the second stage and the third stage and that the amounts of phase shift in the phase offset adjustment circuits 43b are made different. Accordingly, the configuration of the signal component demultiplexing apparatus 43 combining the branching circuits having a simple configuration is simple. Further, the decimation is carried out in units of 1/(power of 2). Therefore, even a multi-carrier signal comprised of a large number of modulated subcarriers becomes simple in circuit configuration.

The above embodiment was illustrated with respect to an 8-symbol string, but demultiplexing of any of an 8-symbol string, 16-symbol string, 32-symbol string, etc. is possible. No matter what the demultiplexing, it can be realized according to a method similar to the above. Further, needless to say, demultiplexing to a 2-symbol string and a 4-symbol string is also possible.

Second Embodiment of Receiving Apparatus

Figure 8:
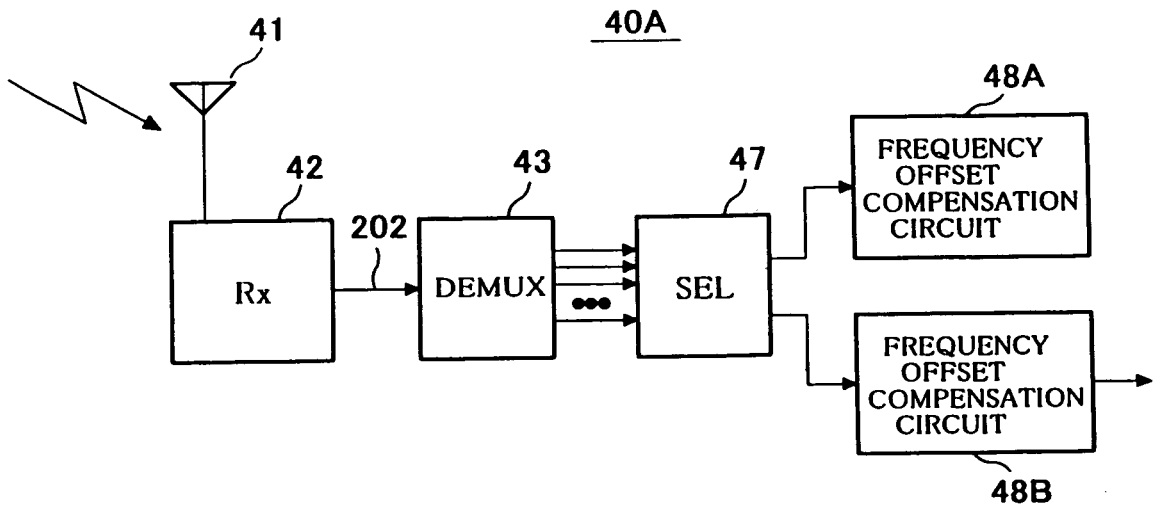
FIG. 8 is a view of the configuration of a receiving apparatus according to a second embodiment of the present invention.

FIG. 8 is a view of the configuration of a receiving apparatus 40A according to a second embodiment of the present invention.

The receiving apparatus 40 A illustrated in FIG. 8 receives a multi-carrier signal transmitted from the transmitting apparatus 30 illustrated in FIG. 1A in the same way as the receiving apparatus 40 illustrated in FIG. 1B.

The receiving apparatus 40A has a signal component demultiplexing apparatus 43, a signal selection circuit 47, and two frequency offset compensation circuits 48A and 48B.

In this embodiment, the example where two frequency offset compensation circuits 48A and 48B are provided is illustrated, but a greater number of frequency offset compensation circuits can be provided in parallel.

After the frequency offset compensation circuits 48A and 48B, a number of sets of the FFT and/or descrambling means 44, bit extraction circuit 45, decoding circuit 46, etc. illustrated in FIG. 1B equal to the number of the frequency offset compensation circuits, that is, two in the present embodiment, are provided.

The signal component demultiplexing apparatus 43 can be configured by hierarchically arranged branching circuits similar to those illustrated in FIG. 4. Accordingly, the signal component demultiplexing apparatus 43 gives signal components obtained by demultiplexing the signal components in units of subcarriers in $2^c$ ways (note, c is any integer).

The signal selection circuit 47 selects and outputs the symbols of the intended subcarrier from among the signal components demultiplexed at the signal component demultiplexing apparatus 43. As apparent from the illustration of FIG. 4, to which group of subcarriers the output of a final stage branching circuit of the signal component demultiplexing apparatus 43 corresponds is determined uniquely, so the selection of the symbols in the signal selection circuit 47 is easy. In this example, the signal selection circuit 47 selects and outputs two symbols, but the number of symbols selected in the signal selection circuit 47 can be set to 1 or any greater number as well.

Since the signals of the group of subcarriers selected at the signal selection circuit 47 have the frequency offsets as illustrated in FIG. 3, the frequency offset compensation circuits 48A and 48B compensate for them.

Figure 9:
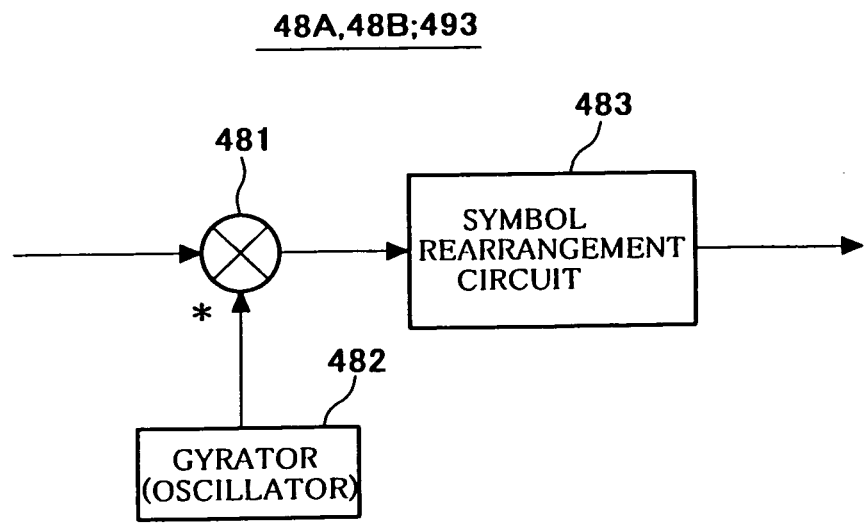
FIG. 9 is a view of the configuration of a frequency offset compensation and/or elimination circuit illustrated in FIG. 8.

FIG. 9 is a view of an example of the circuit configuration of the frequency offset compensation circuits 48A and 48B.

Each of the frequency offset compensation circuits 48A and 48B has a multiplier 481, a gyrator (oscillator) 482, and a symbol rearrangement circuit 483.

The signals input to the multiplier 481 have frequency offsets different in a plus direction shown below with a reference 0 Hz.

$$\exp(j2\pi(k/N)i+\pi k) \quad (1)$$

In order to eliminate this offset, the gyrator 482 outputs the signal of the complex sine wave conjugate with the offset shown below to the multiplier 481. In this way, the gyrator 482 is a signal generation device for generating the following complex component signal.

$$\exp(-j2\pi(k/N)i+\pi k) \quad (2)$$

The multiplier 481 multiplies the symbols selected at the signal selection circuit 47 and the complex sine wave signal from the gyrator 482 to convert the frequency and eliminate the offset component.

The symbol rearrangement circuit 483 switches the first half and the second half of the results of the frequency conversion and outputs the results thereof.

In the present embodiment, before the FFT processing in the FFT and/or descrambling means 44 of FIG. 1B, the number of symbols to be processed in two ways in the present embodiment is reduced, therefore the configuration of the FFT circuit becomes simple, and the processing speed is improved.

Namely, according to the present embodiment, the number of symbols handled in the FFT and/or descrambling means becomes half of that of FIG. 1B explained above.

When the number of symbols is represented by N, the number of gates configuring the FFT circuit becomes a number of gates proportional to (logN). Accordingly, if the number of symbols input to the FFT circuit becomes small, the number of gates of the FFT circuit becomes extremely small.

When comparing the number of gates of FFT in the FFT and/or descrambling means 44 and the sum of the numbers of gates of the two FFT circuits of the FFT and/or descrambling means in the receiving apparatus illustrated in FIG. 8, the sum of the numbers of gates of the two FFT circuits of the FFT and/or descrambling means of the present embodiment becomes smaller. This means that the circuit configuration becomes simpler in the case where two FFT and/or descrambling means are provided than the case of one FFT and/or descrambling means 44 illustrated in FIG. 1B. Further, the FFT circuit having the simple configuration can raise the operation speed. Accordingly, if the receiving apparatus 40A of FIG. 8 is used, there are the advantages that the entire circuit configuration becomes simple and the operation speed is improved.

Note that, the number of the groups of subcarriers selected in the signal selection circuit 47 is not limited to two. Just one group of subcarriers or a plurality of groups of subcarriers more than two may also be selected.

Third Embodiment of Receiving Apparatus

Figure 10:
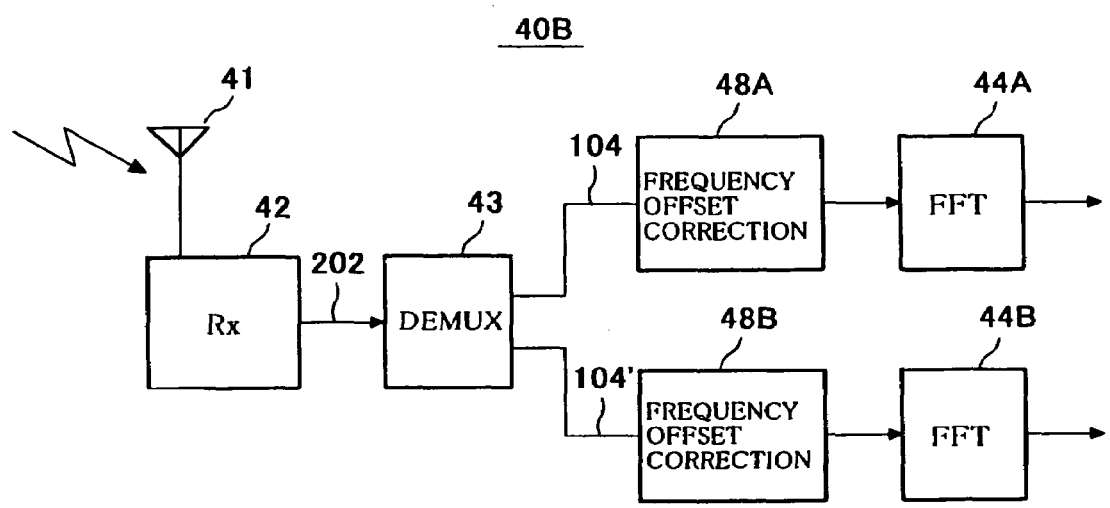
FIG. 10 is a view of the configuration of a receiving apparatus according to a third embodiment of the present invention.

FIG. 10 is a view of the configuration of a receiving apparatus 40B according to a third embodiment of the present invention.

The receiving apparatus 40B illustrated in FIG. 10 receives a multi-carrier signal transmitted from the transmitting apparatus 30 illustrated in FIG. 1A in the same way as the receiving apparatus 40 illustrated in FIG. 1B or in the same way as the receiving apparatus 40A illustrated in FIG. 8.

The receiving apparatus 40B has a high frequency receiver circuit 42, a signal component demultiplexing apparatus 43, and two frequency offset compensation circuits 48A and 48B.

In this embodiment, the example where two frequency offset compensation circuits 48A and 48B are provided is illustrated, but a greater number of frequency offset compensation circuits may also be provided in parallel.

After the frequency offset compensation circuits 48A and 48B, a number of sets of the FFT and/or descrambling means 44, bit extraction circuit 45, decoding circuit 46, etc. illustrated in FIG. 1B equal to the number of the frequency offset compensation circuits, that is, two in the present embodiment, are provided.

The signal component demultiplexing apparatus 43 is provided with, for example, a first stage branching circuit 431, a second stage branching circuit 432₁, and third stage branching circuits 433₁ and 433₂ illustrated in FIG. 4. As a result, the signal component demultiplexing apparatus 43 demultiplexes the group of subcarriers C0, C4, C2, and C6 and the group of subcarriers C1, C5, C3, and C7.

Since the signals of the groups of subcarriers demultiplexed at the signal component demultiplexing apparatus 43 have frequency offsets as illustrated in FIG. 3, the frequency offset compensation circuits 48A and 48B compensate for them.

The frequency offset compensation circuits 48A and 48B were explained in the second embodiment. Namely, an example of the circuit configuration of the frequency offset compensation circuits 48A and 48B was illustrated in FIG. 9, and the operation thereof was explained above, so the explanation will be omitted.

The FFT and/or descrambling means 44A and 44B perform the FFT processing, etc. for the group of subcarriers C0, C4, C2, and C6 and the group of subcarriers C1, C5, C3, and C7 compensated for frequency offset at the frequency offset compensation circuits 48A and 48B.

The number of symbols handled in the FFT and/or descrambling means 44A and 44B becomes half of that of FIG. 1B explained above. When the number of symbols is represented by N, the number of gates configuring the FFT circuit becomes the number of gates proportional to (logN). Accordingly, if the number of symbols input to the FFT circuit becomes small, the number of gates of the FFT circuit becomes extremely small. When comparing the number of gates of the FFT in the FFT and/or descrambling means 44 and the sum of the numbers of gates of two FFT circuits of the FFT and/or descrambling means 44A and 44B illustrated in FIG. 10, the sum of the numbers of gates of the two FFT circuits of the FFT and/or descrambling means 44A and 44B becomes smaller. This means that the circuit configuration becomes simpler in the case where two FFT and/or descrambling means 44A and 44B are provided than the case of one FFT and/or descrambling means 44 illustrated in FIG. 1B. Further, the FFT circuit having the simple configuration can raise the operation speed.

Accordingly, if the receiving apparatus 40B of FIG. 10 is used, there are the advantages that the entire circuit configuration becomes simple, and also the operation speed is improved.

In the above example, the description was made of the case where two sets of frequency offset compensation circuits and FFT and/or descrambling means 44A and 44B were provided, but any power of 2 of these may also be provided in parallel.

Fourth Embodiment of Receiving Apparatus

Figure 11:
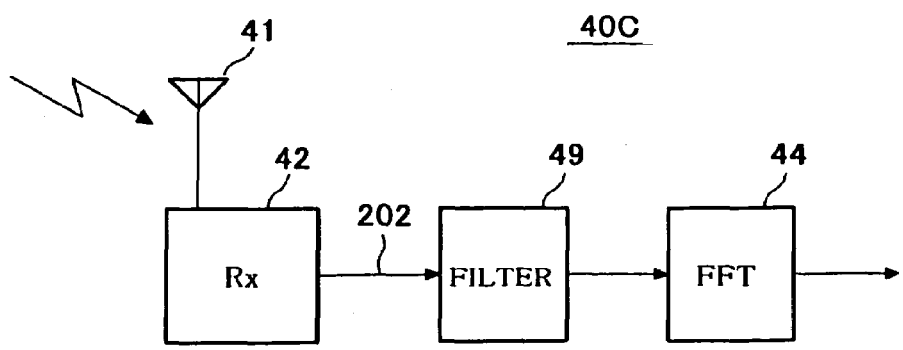
FIG. 11 is a schematic view of the configuration of a receiving apparatus according to a fourth embodiment of the present invention.

FIG. 11 is a schematic view of the configuration of a receiving apparatus 40C of a fourth embodiment of the present invention.

The receiving apparatus 40C demultiplexes and decodes a multi-carrier signal transmitted from the transmitting apparatus 30 of FIG. 1A in the same way as the receiving apparatuses 40, 40A and 40B of the first to third embodiments.

The receiving apparatus 40C has a receiving antenna 41, a high frequency receiver circuit 42, a filter apparatus 49, and an FFT and/or descrambling means 44.

The circuits after the FFT and/or descrambling means 44 are similar to those of FIG. 1B.

Explaining the difference between the receiving apparatus 40C illustrated in FIG. 11 and the receiving apparatuses 40, 40A, and 40B, the receiving apparatus 40C does not extract a plurality of symbol series by using the signal component demultiplexing apparatus 43 as in the receiving apparatuses 40, 40A, and 40B, but extracts only the signal components of one intended group of subcarriers by the filter apparatus 49 and processes the result thereof in the circuits after the FFT and/or descrambling means 44.

The high frequency receiver circuit 42 converts the frequency of the high frequency signal received at the receiving antenna 41 to the baseband area as explained above and converts the signal converted in frequency to the baseband area from an analog signal to a digital signal (9-symbol string).

The filter apparatus 49 receives as its inputs the digital symbol strings from the high frequency receiver circuit 42, filters the same in units of subcarriers, and extracts only the intended group of subcarriers. The filter apparatus 49 outputs only the minimum number of samples required for expressing the group of subcarriers to be output. As a result, a great decimation on the frequency axis is realized.

The difference between the signal component demultiplexing apparatus (branching circuit) and the filter apparatus will be explained next. The signal component demultiplexing apparatus receives as its input one group of signals and outputs two groups of signals demultiplexed from the one group of signals. Contrarily to this, the filter apparatus receives as its input one group of signals and selects and outputs one group of signals of the specific frequency band.

The circuits after the FFT and/or descrambling means 44 perform the processing in the same way as those explained by referring to the circuits of the receiving apparatus 40 of FIG. 1B, etc.

First Embodiment of Filter Apparatus

Figure 12:
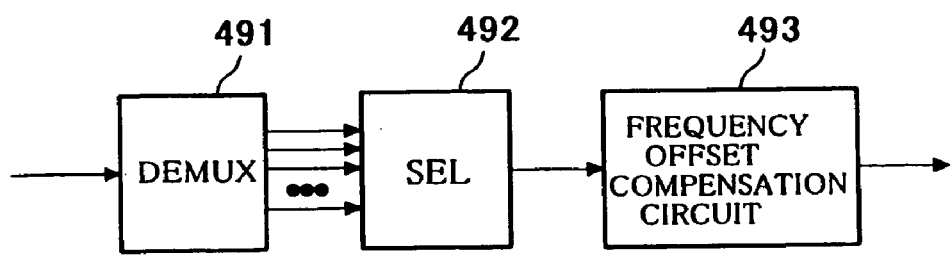
FIG. 12 is a view of the configuration of a first embodiment of a filter apparatus shown in FIG. 11.

FIG. 12 is an example of the circuit of a first embodiment of the filter apparatus shown in FIG. 11.

The filter apparatus 49 illustrated in FIG. 12 is configured by a signal component demultiplexing apparatus (demultiplexer) 491, a symbol group selection circuit 492, and a frequency offset compensation circuit (frequency offset compensation and/or elimination circuit) 493.

The configuration of the filter apparatus 49 resembles the circuit configuration of FIG. 8, that is, the signal component demultiplexing apparatus 43, signal selection circuit 47, and frequency offset compensation and/or elimination circuits 48A and 48B. The filter apparatus 49 substantially performs equivalent processes to those of these circuits 43, 47, 48A, and 48B of FIG. 8.

The signal component demultiplexing apparatus 491 is configured by a combination of the branching circuits illustrated in FIG. 4 in the same way as the signal component demultiplexing apparatus 43 of FIG. 8.

The symbol group selection circuit 492 is similar to the signal selection circuit 47 of FIG. 8.

The frequency offset compensation and/or elimination circuit 493 is configured in the same way as the frequency offset compensation and/or elimination circuits 48A and 48B illustrated in FIG. 9.

The signal component demultiplexing apparatus 491 demultiplexes the symbols at the intervals of the intended subcarriers for the symbol strings output from the high frequency receiver circuit 42.

The frequency offset compensation and/or elimination circuit (frequency offset compensation circuit) 493 is configured as illustrated in FIG. 9, converts the frequency of the input symbols (signal) to the group of subcarriers with a reference 0 Hz, and eliminates the frequency offset.

The FFT and/or descrambling means 44 of FIG. 11 performs the FFT processing for only the selected symbols, so the number of points of the DFT can be kept small, and the circuit configuration of the FFT and/or descrambling means 44 becomes simple.

Second Embodiment of Filter Apparatus

Figure 13:
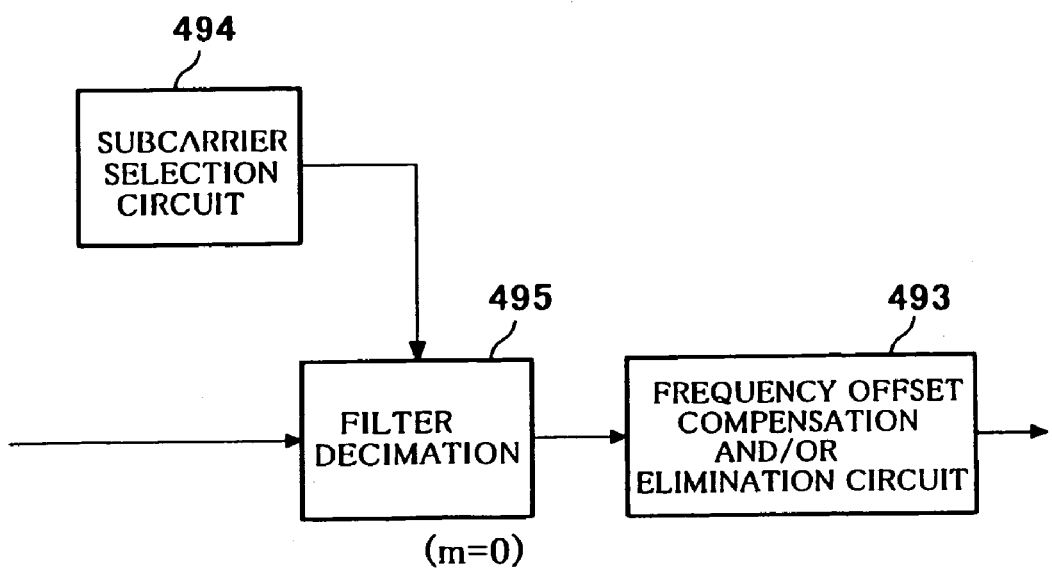
FIG. 13 is a view of the configuration of a second embodiment of the filter apparatus of FIG. 11.

FIG. 13 is an example of the circuit of the second embodiment of the filter apparatus of FIG. 11.

The filter apparatus of the second embodiment is a filter apparatus for branching the received group of subcarriers to odd number subcarriers and even number subcarriers.

The filter apparatus 49A of the second embodiment has a subcarrier selection circuit 494, a filter and decimation circuit 495 and the frequency offset compensation and/or elimination circuit 493.

Figure 14:
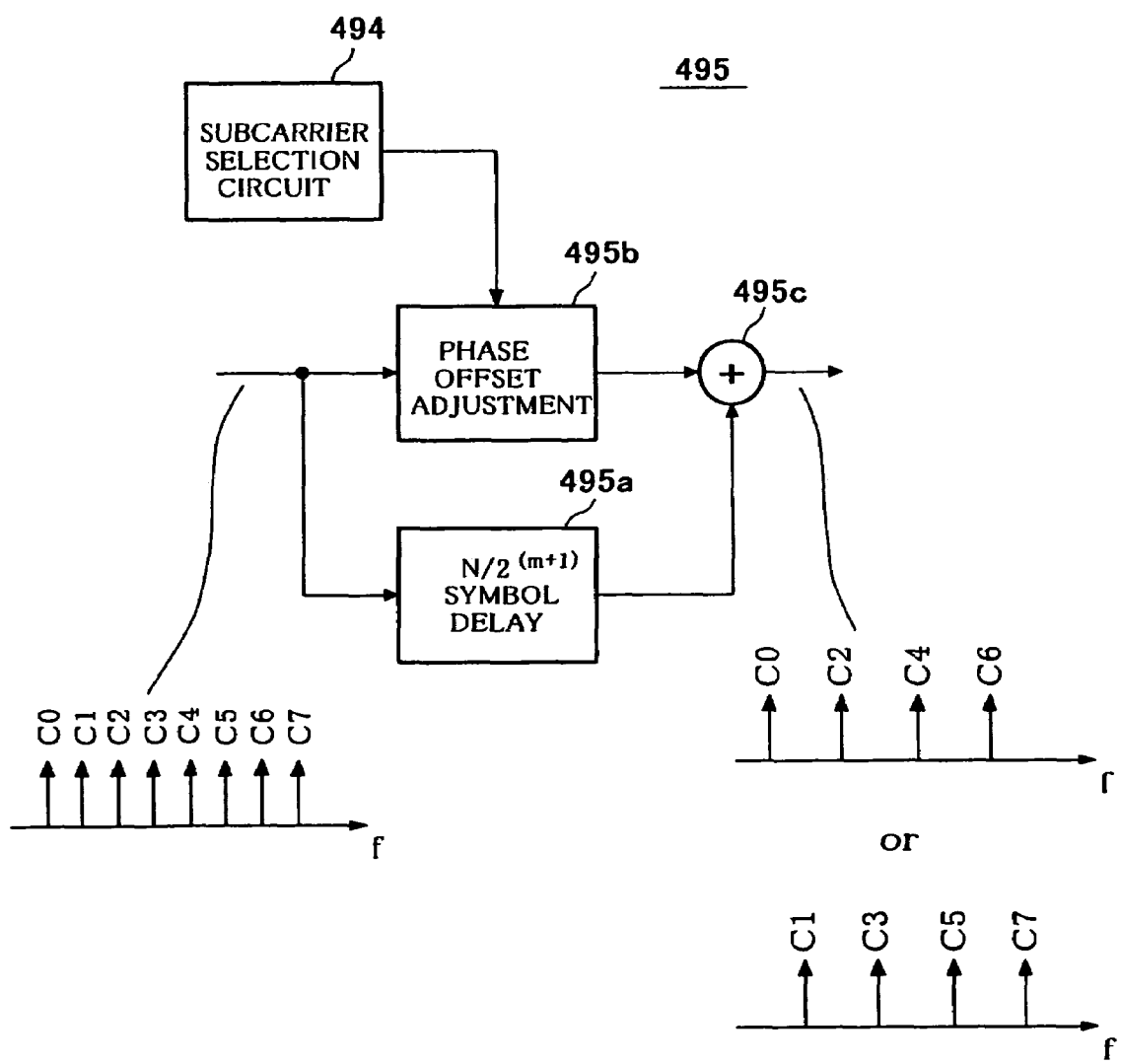
FIG. 14 is a view of the configuration of a filter and decimation circuit illustrated in FIG. 13.

FIG. 14 is a view of an example of the circuit configuration of the filter and decimation circuit 495 illustrated in FIG. 13.

The filter and decimation circuit 495 is configured by a symbol delay circuit 495a, a phase offset adjustment circuit 495b, and an adder circuit 495c.

The circuit configuration of the filter and decimation circuit 495 resembles one unit of the branching circuit of the signal component demultiplexing apparatus 43 illustrated in FIG. 5. Namely, the symbol delay circuit 495a corresponds to the symbol delay circuit 43a, the phase offset adjustment circuit 495b corresponds to the phase offset adjustment circuit 43b, and the adder circuit 495c corresponds to the adder circuit 43c. Note that the filter and decimation circuit 495 is not provided with the subtractor circuit 43d. The reason for this is that both of the even number subcarriers and the odd number subcarriers are not required in the filter and decimation circuit 495 unlike the branching circuit illustrated in FIG. 5, and the output of only one is sufficient.

The symbol delay circuit 495a delays the input subcarriers C0 to C7 by exactly the amount of the points determined by the parameters N and m, that is, $N/(2^{(m+1)})$, in advance. In the present embodiment, m=0, so the delay of the symbol delay circuit 495a becomes N/2.

The subcarrier selection circuit 494 selects the intended subcarriers.

The phase offset adjustment circuit 495b shifts the phase of the input subcarriers C0 to C7 in accordance with the passed group of subcarriers selected at the subcarrier selection circuit 494.

The value of phase rotation (amount of phase shift) performed at the phase offset adjustment circuit 495b is $-(\alpha/2^m)\pi$ (radian). The parameter $\alpha$ is a value determined according to the group of subcarriers to be passed and the parameter m and has a regularity shown in the following Table 1. In the following table, C0 to C7 mean the subcarriers arranged from 0 Hz.

TABLE 1

Table 1

| Passed carrier | m = 2 | m = 1 | m = 0 |
|---|---|---|---|
| C0 | α = 0 | α = 0 | α = 0 |
| C4 | α = 4 | | |
| C2 | α = 2 | α = 2 | |
| C6 | α = 6 | | |
| C1 | α = 1 | α = 1 | α = 1 |
| C5 | α = 5 | | |
| C3 | α = 3 | α = 3 | |
| C7 | α = 7 | | |

By providing multiple stages of filter and decimation circuits 495, a K (capital letter)=8, 16, 32, or other filter apparatus can be configured. In that case, the value of the phase rotation performed at the phase offset adjustment circuit 495b of each stage becomes the value shown in the following Table 2. Note that examples are shown for up to K=8 in Table 2.

TABLE 2

| m | 0 | | 1 | | 2 | | ... |
|---|---|---|---|---|---|---|---|
| Rotation phase value/ passed carrier | 0 | C0 C2 C4 C6 | −0/2 π | C0 C4 | −0/4 π −4/4 π | C0 C4 | ... ... ... ... |
| | | | −2/2 π | C2 C6 | −2/4 π −6/4 π | C2 C6 | ... ... ... |
| | −π | C1 C3 C5 C7 | −1/2 π | C1 C5 | −1/4 π −5/4 π | C1 C5 | ... ... ... |
| | | | −3/2 π | C3 C7 | −3/4 π −7/4 π | C3 C7 | ... ... ... |

In the present embodiment, the value of the phase rotation at the phase offset adjustment circuit 495b is 0 (rad) when passing even number carriers and π(rad) when passing odd number carriers. Which phase rotation is applied is suitably indicated by a subcarrier selection circuit 404.

The adder circuit 495c adds the subcarrier rotated in phase by the phase offset adjustment circuit 495b and the subcarrier delayed at the symbol delay circuit 495a.

As a result, for example, when the subcarriers C0 to C7 are input to the filter and decimation circuit 495, the filter and decimation circuit 495 outputs the symbols of one of the subcarrier series designated at the subcarrier selection circuit 494.

The frequency offset compensation and/or elimination circuit 493 in the filter apparatus 49A of FIG. 13 is configured in the same way as illustrated in FIG. 9 in the same way as the frequency offset compensation and/or elimination circuit 493 of FIG. 12. The frequency offset compensation and/or elimination circuit 493 operates in the same way as that of the frequency offset compensation and/or elimination circuits 48A and 48B of FIG. 8 explained above or the frequency offset compensation and/or elimination circuit 493 of FIG. 12.

The filter apparatus 49A illustrated in FIG. 13 performs decimation on the frequency axis by the filter and decimation circuit 495 and halves the number of the output symbols. Accordingly, the signal processing after that become simple and quick.

Third Embodiment of Filter Apparatus

Figure 15:
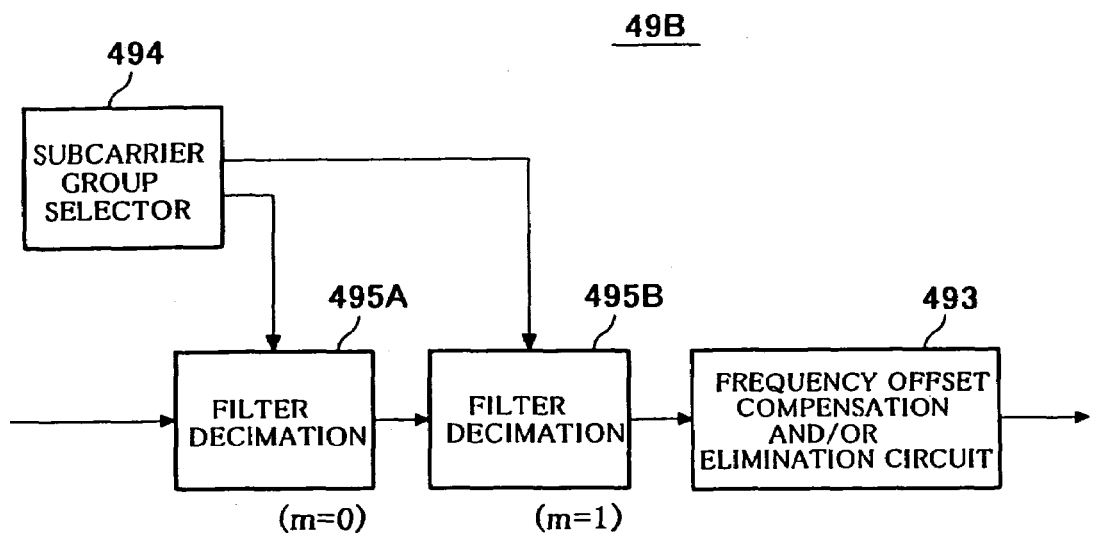
FIG. 15 is a view of the configuration of a third embodiment of the filter apparatus illustrated in FIG. 11.

FIG. 15 is a circuit diagram of a third embodiment of the filter apparatus illustrated in FIG. 11.

A filter apparatus 49B illustrated in FIG. 15 has a subcarrier selection circuit 494, a first filter and decimation circuit 495A, a second filter and decimation circuit 495B, and a frequency offset compensation and/or elimination circuit 493.

The filter apparatus 49B is obtained by replacing the filter and decimation circuit 495 of the filter apparatus 49A illustrated in FIG. 13 by the two filter and decimation circuits 495A and 495B provided in series. Both of the filter and decimation circuits 495A and 495B have the circuit configuration illustrated in FIG. 14. The first stage filter and decimation circuit 495A has m=0 and the second stage filter and decimation circuit 495B has m=1. By applying these parameters m, as illustrated in FIG. 6, the amounts of delay in the filter and decimation circuits 495A and 495B are defined.

The frequency offset compensation and/or elimination circuit 493 can employ the same circuit configuration as that of the circuit illustrated in FIG. 9.

The value of the phase rotation (amount of phase shift) by the phase offset adjustment circuit 495b is $-(\alpha/2^m)\pi$ (radian). The parameter a is determined according to the group of subcarriers to be passed and the parameter m and has the regularity shown in Table 1.

By providing multiple stages of the filter and decimation circuit 495, K (capital letter)=8, 16, 32, and other filter apparatuses can be configured. In that case, the value of the phase rotation at the phase offset adjustment circuit 495b of each becomes the value shown in Table 2.

In the present embodiment, the value of the phase rotation at the phase offset adjustment circuit 495b is 0 (rad) when passing even number carriers and π(rad) when passing odd number carriers. Which rotation phase is applied is suitably indicated by the subcarrier selection circuit 404.

The adder circuit 495c adds the subcarrier rotated in phase at the phase offset adjustment circuit 495b and the subcarrier delayed at the symbol delay circuit 495a.

As a result, for example, when the subcarriers C0 to C7 are input to the filter and decimation circuit 495, the filter and decimation circuit 495 outputs the symbols of any one subcarrier series designated at the subcarrier selection circuit 494.

The filter apparatus 49B illustrated in FIG. 15 is provided with two filter and decimation circuits 495A and 495B, so becomes the filter apparatus outputting any one of a group of four subcarriers. Namely, it is a circuit for outputting a signal deciminated to ¼ on the frequency axis.

In the present embodiment, the case where two filter and decimation circuits 495A and 495B were connected in series was illustrated, but it is possible to connect them in a greater number of stages (m), for example, three stages or four stages, demultiplex the signal to groups of $2^3$, $2^4$, and $2^m$ subcarriers and pass one group of subcarriers among them. In that case, the regularity of the parameter m of each filter and decimation circuit is similar to that of FIG. 4. Further, the value of the phase to be rotated is determined according to the regularity shown in Table 1 and Table 2.

Fourth Embodiment of Filter Apparatus

Figure 16:
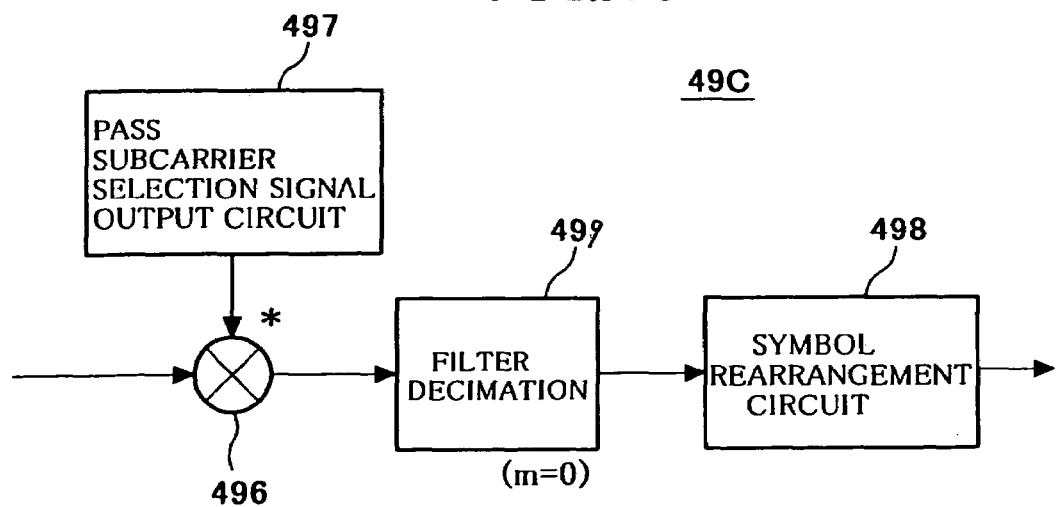
FIG. 16 is a view of the configuration of a fourth embodiment of the filter apparatus illustrated in FIG. 11.

FIG. 16 is an example of a circuit of a fourth embodiment of the filter apparatus illustrated in FIG. 11.

A filter apparatus 49C has a multiplier 496, a pass subcarrier selection signal output circuit 497, a filter and decimation circuit 499, and a symbol rearrangement circuit 498.

The frequency offset of the symbol string to be input to the multiplier 496 is the same as the frequency offset of the symbol string input to the multiplier 481 of FIG. 9.

The pass subcarrier selection signal output circuit 497 outputs a complex sine wave signal in accordance with the channel to be selected to the multiplier 496 in the same way as the gyrator (oscillator) 482 illustrated in FIG. 9 in order to eliminate the frequency offset thereof.

The multiplier 496 multiplies the symbol series from the high frequency receiver circuit 42 and the complex sine wave signal output from the pass subcarrier selection signal output circuit 497. This operation is carried out in order to impart a frequency offset to the symbols (subcarrier component) to be selected at the filter apparatus 49C in the symbol series input to the filter apparatus 49C so that 0 Hz is contained therein.

Accordingly, the pass subcarrier selection signal output circuit 497 outputs the conjugate with the signal of the frequency of the amount of the subcarrier nearest to 0 Hz in the positive frequency direction among the subcarriers selected. The multiplier 496 multiplies the conjugate signal and the input symbols and eliminates the frequency offset.

The filter and decimation circuit 499 will be explained next by referring to FIG. 17.

Figure 17:
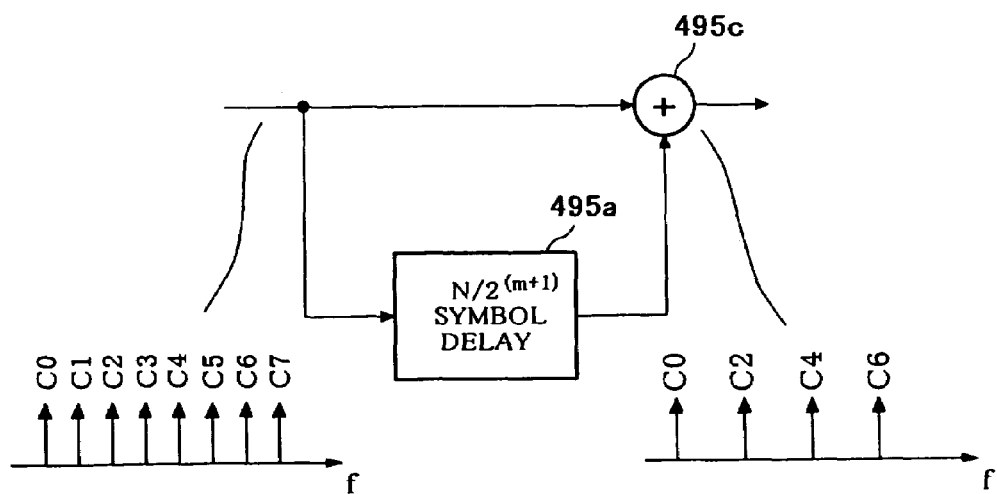
FIG. 17 is a view of the configuration of the filter and decimation circuit illustrated in FIG. 16.

FIG. 17 is an example of the circuit of the filter and decimation circuit 499 illustrated in FIG. 16.

The filter and decimation circuit 499 is configured by the symbol delay circuit 495a and the adder circuit 495c.

The circuit configuration of the filter and decimation circuit 499 is obtained by deleting the phase offset adjustment circuit 43b and the subtractor circuit 43d from the branching circuit illustrated in FIG. 5 and obtained by deleting the phase offset adjustment circuit 495b from the circuit configuration of the filter and decimation circuit 495 illustrated in FIG. 14.

The filter and decimation circuit 499 is a circuit for selecting and outputting only the symbol series of the channels of the even number subcarriers from among the input subcarriers with a reference 0 Hz.

Also, the filter and decimation circuit 499 halves the number of output symbols. This means decimation was carried out on the frequency axis.

The symbol rearrangement circuit 498 rearranges the order of the group of symbol (group of subcarriers) output from the filter and decimation circuit 499 between the first half and second half and outputs only the symbols of the second half as valid symbols.

Fifth Embodiment of Filter Apparatus

Figure 18:
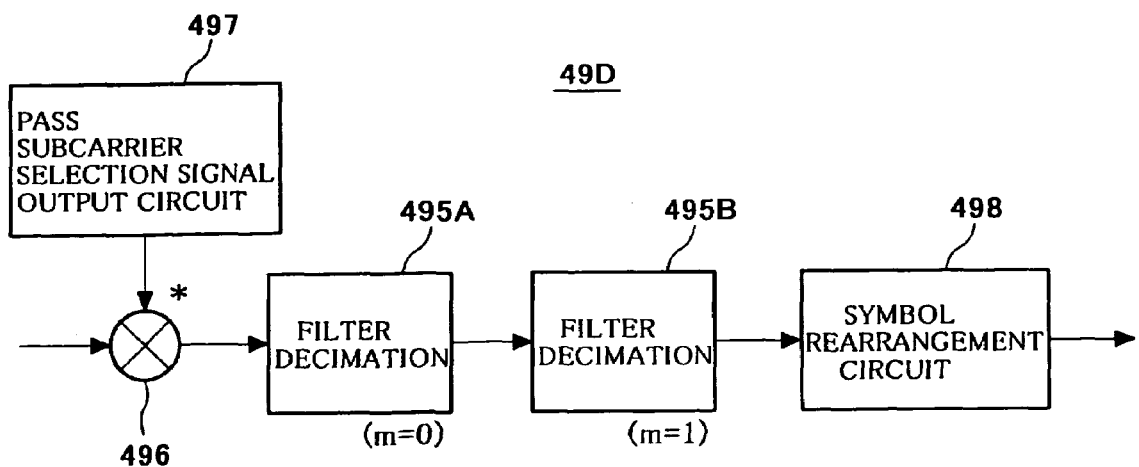
FIG. 18 is a view of the configuration of a fifth embodiment of the filter apparatus illustrated in FIG. 11.

FIG. 18 is an example of the circuit of a fifth embodiment of the filter apparatus illustrated in FIG. 11.

A filter apparatus 49D has a multiplier 496, a channel selection signal output signal 497, first and second filter and decimation circuits 499A and 499B, and a symbol rearrangement circuit 498.

The first and second filter and decimation circuits 499A and 499B are configured in the same way as that of the filter and decimation circuit 499 explained by referring to FIG. 17.

The filter apparatus 49D is obtained by adding the second filter and decimation circuit 499B to the filter apparatus 49C illustrated in FIG. 16. By the addition of the filter and decimation circuit 499B, in the same way as the two filter and decimation circuits 495A and 495B illustrated in FIG. 15, the passed carriers can be further restricted to ½ from that of the filter apparatus 49C illustrated in FIG. 16.

The rest of the configuration is similar to that of the filter apparatus 49C illustrated in FIG. 16.

Note that by connecting further filter and decimation circuits 499 in series, for example, by connecting m stages in series, the passed carriers can be restricted to $½^m$.

Fifth Embodiment of Receiving Apparatus

Figure 19:
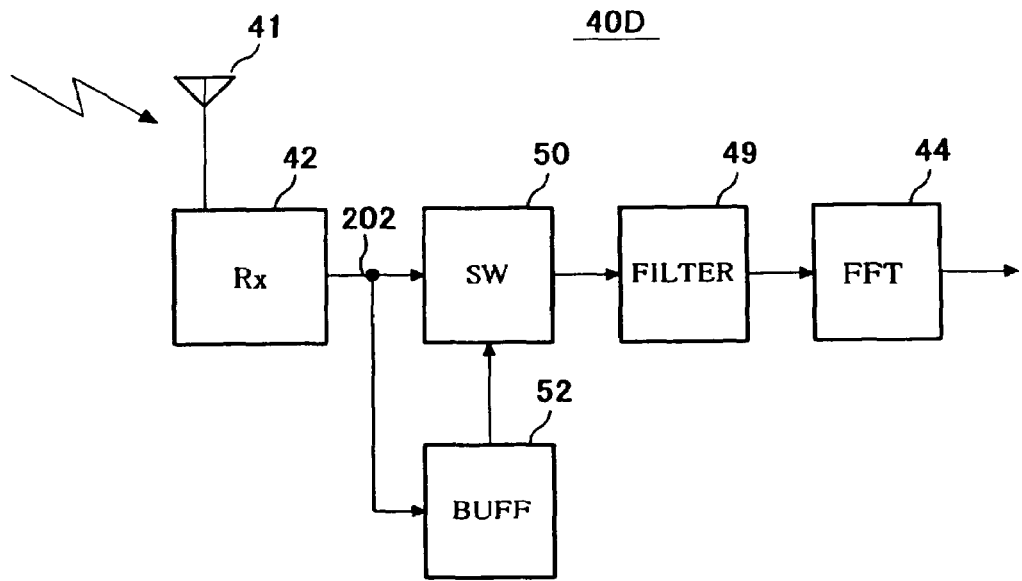
FIG. 19 is a view of the configuration of the receiving apparatus of a fifth embodiment of the present invention.

FIG. 19 is a view of the configuration of the receiving apparatus of a fifth embodiment of the present invention.

The receiving apparatus 40D has a receiving antenna 41, a high frequency receiver circuit 42, a switch circuit 50, a buffer circuit 52, a filter apparatus 49, an FFT and/or descrambling means 44, and a not shown bit extraction circuit 45 and decoding circuit 46 illustrated in FIG. 1B.

The high frequency receiver circuit 42 operates in the same way as that described above.

The switch circuit 50 outputs the signal of the high frequency receiver circuit 42 to the filter apparatus 49 in an initial state.

During this, the buffer circuit 52 continues to store the signal of the high frequency receiver circuit 42 until all single symbol amounts of the signal are transferred to the filter apparatus 49.

The filter apparatus 49 is the filter apparatus 49 shown as in the above various types of embodiments, extracts only part of the subcarriers designated from among the signal input from the high frequency receiver circuit 42 after passing through the switch circuit 50, for example, only the signal of the even number carriers, decimates it on the frequency axis, and outputs the selection signal thereof to the FFT and/or descrambling means 44.

The FFT and/or descrambling means 44 is configured as the circuit for performing the FFT processing for a number of subcarriers smaller than the number of the subcarriers received at the high frequency receiver circuit 42. Namely, the FFT and/or descrambling means 44 is configured small in size and so that high speed operation is possible. After the FFT processing, etc. in the FFT and/or descrambling means 44, the processing in the bit extraction circuit 45, decoding circuit 46, etc. illustrated in FIG. 1A is carried out.

After all single symbol amounts of the signal are transferred from the high frequency receiver circuit 42 to the filter apparatus 49, the buffer circuit 52 starts the transmission of the signal to the filter apparatus 49 through the switch circuit 50.

The switch circuit 50 switches so as to apply the signal from the buffer circuit 52 to the filter apparatus 49 after the transfer of the signal of the high frequency receiver circuit 42 to the filter apparatus 49 is terminated.

The filter apparatus 49 extracts the signal passing the signal component which becomes necessary in the present communication among the signal components which were not passed previously, for example, the odd number carriers, and applies the same to the FFT and/or descrambling means 44.

The FFT and/or descrambling means 44 performs the FFT processing on the signal input again to extract the received symbols and makes the circuits after the bit extraction circuit 45 perform processing.

By employing the circuit configuration illustrated in FIG. 19, extraction of received symbols becomes possible by a circuit having a smaller scale than that of the FFT circuit originally required for the FFT processing for the symbols received at the high frequency receiver circuit 42. Namely, when the circuit configuration of FIG. 19 is employed, the circuit scale of the FFT and/or descrambling means 44 can be made smaller.

As the circuit configuration of the receiving apparatus illustrated in FIG. 19, the case where the received symbols were halved was illustrated, but by further reducing the passed carriers in the filter apparatus 49, it can be modified to reduce them to ¼, ⅛, etc. As a result, the circuit scale of the FFT and/or descrambling means 44 becomes further smaller.

Sixth Embodiment of Receiving Apparatus

Figure 20:
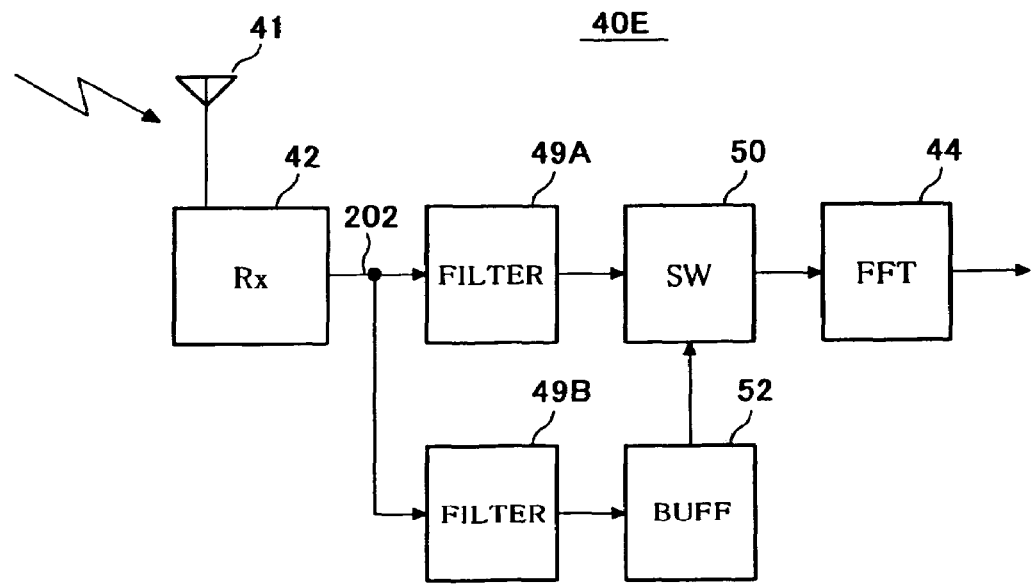
FIG. 20 is a view of the configuration of the receiving apparatus of a sixth embodiment of the present invention.
Figure 22:
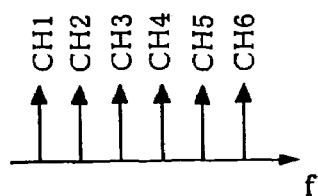
FIG. 22 is a graph showing an example of symbol strings formed into a multi-carrier signal output from the transmitting apparatus of FIG. 21A.
Figure 23:
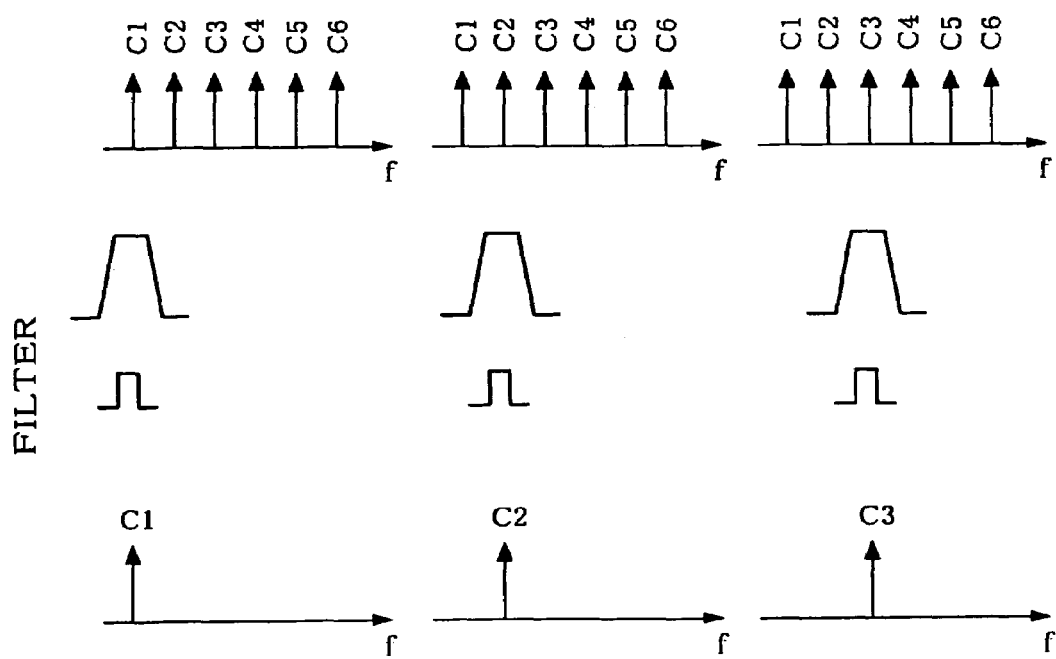
FIG. 23 is a graph showing a first method for demultiplexing a multi-carrier signal of the related art.
Figure 24:
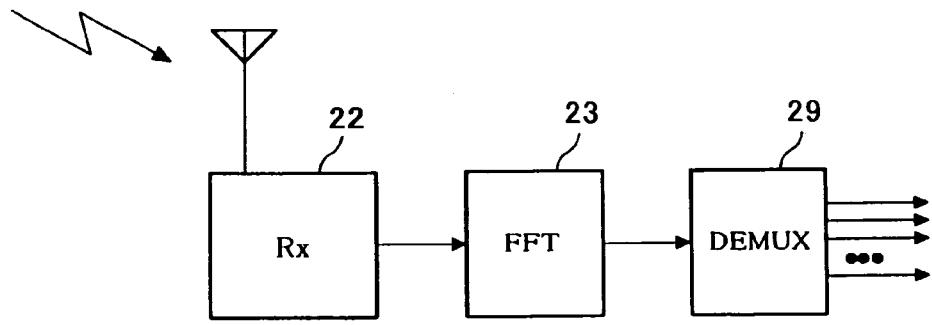
FIG. 24 is a view of the configuration of a receiving apparatus showing a second method for demultiplexing a multi-carrier signal of the related art.
Figure 25:
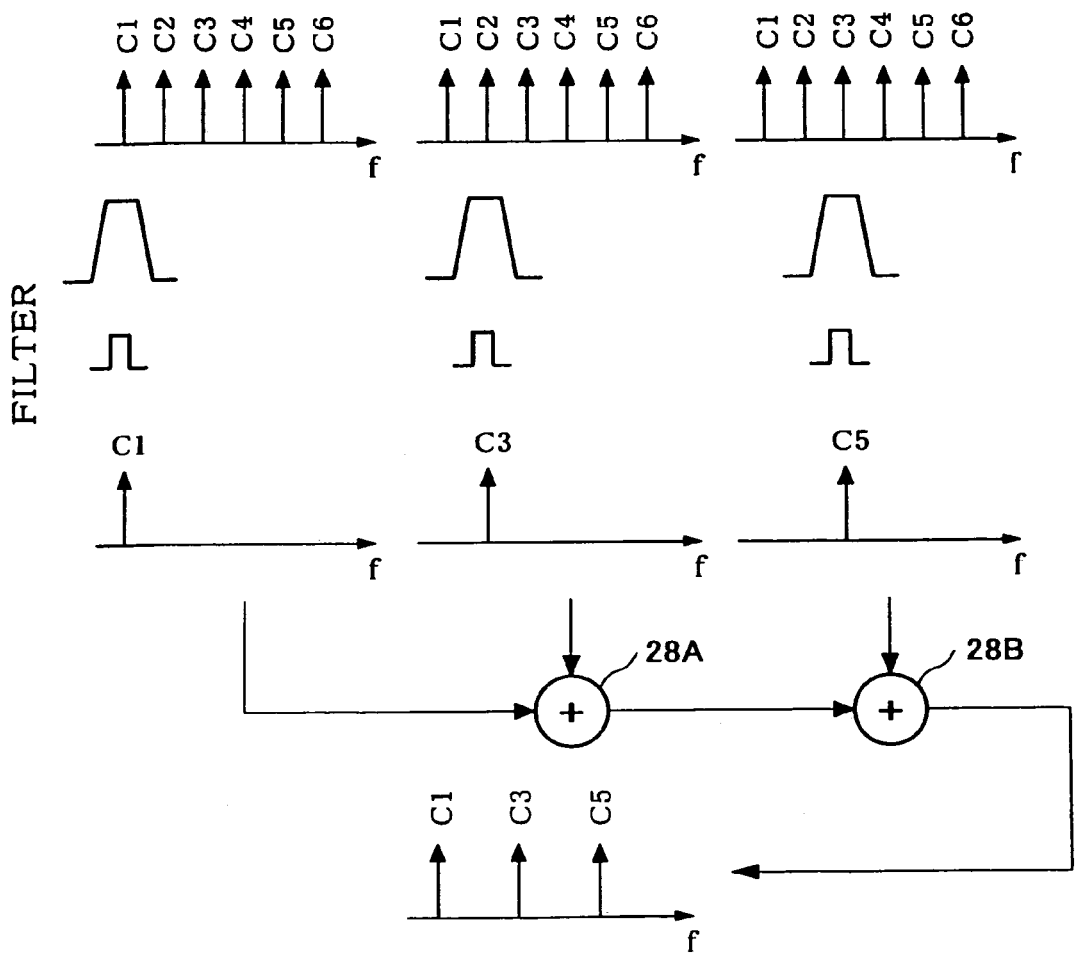
FIG. 25 is a graph showing extraction of carriers of a fixed period of the related art.

FIG. 20 is a view of the configuration of the receiving apparatus of a sixth embodiment of the present invention.

A receiving apparatus 40E has a receiving antenna 41, a high frequency receiver circuit 42, a first filter apparatus 49A, a second filter apparatus 49B, a switch circuit 50, a buffer circuit 52, an FFT and/or descrambling means 44, and the bit extraction circuit 45 and decoding circuit 46 illustrated in FIG. 1B but the illustration of which being omitted.

The high frequency receiver circuit 42 operates in the same way as that described above.

The filter apparatuses 49A and 49B can employ the circuit configurations of the various types of filter apparatuses 49 explained above. The first filter apparatus 49A, for example, extracts the signal of the even number carriers, while the second filter apparatus 49B, for example, extracts the signal of the odd number carriers. Namely, in the present embodiment, the filter apparatuses 49A and 49B decimate the symbols to ½.

The switch circuit 50 outputs the signal of the even number carriers output from the filter apparatus 49A to the FFT and/or descrambling means 44 in the initial state.

During that time, the signal of the odd number carriers selected at the filter apparatus 49B is stored in the buffer circuit 52.

The buffer circuit 52 continues to stores the signal from the filter apparatus 4B until all of the signal to be applied to the FFT and/or descrambling means 44 extracted at the filter apparatus 49A is transferred to the FFT and/or descrambling means 44.

The FFT and/or descrambling means 44 is configured as the circuit for the FFT processing for a number of subcarriers smaller than the number of the subcarriers received at the high frequency receiver circuit 42 output from the filter apparatus 49A. Namely, the FFT and/or descrambling means 44 is configured to be small in size and so that high speed operation is possible. After the FFT processing, etc. in the FFT and/or descrambling means 44, the processing in the bit extraction circuit 45, decoding circuit 46, etc. illustrated in FIG. 1A are carried out.

After all of the signal of the even number carriers from the filter apparatus 49A is transferred to the FFT and/or descrambling means 44, the buffer circuit 52 transfer the signal stored in the FFT and/or descrambling means 44 through the switch circuit 50 to the FFT and/or descrambling means 44.

The switch circuit 50 switches so as to apply the signal from the buffer circuit 52 to the FFT and/or descrambling means 44 when the signal transfer from the filter apparatus 49A to the FFT and/or descrambling means 44 is terminated.

The filter apparatus 49B and the buffer circuit 52 create the signal passing the signal component which will become necessary in the present communication among the signal components which were not previously passed, for example the odd number carriers, and apply the same to the FFT and/or descrambling means 44.

The FFT and/or descrambling means 44 performs the FFT processing for the signals input again to extract the received symbols and makes the circuits after the bit extraction circuit 45 performs the processing.

By employing the circuit configuration of the receiving apparatus illustrated in FIG. 20, extraction of the received symbols becomes possible by a circuit having a smaller scale than that of the FFT circuit originally required for the FFT processing for the symbols received at the high frequency receiver circuit 42.

Namely, when the circuit configuration of FIG. 20 is employed, the circuit scale of the FFT and/or descrambling means 44 can be made smaller.

As the circuit configuration illustrated in FIG. 20, the case where the received symbols were decimated to half was illustrated, but by further reducing the passed carriers in the filter apparatuses 49A and 49B, they can be further reduced to ¼, ⅛, etc. As a result, the circuit scale of the FFT and/or descrambling means 44 becomes further smaller.

The communication system, transmitting apparatus (transmitter) 30, receiving apparatus (receiver) 40, and the signal component demultiplexing apparatus and filter apparatus configuring part of the receiving apparatus (receiver) 40 are not limited to the configurations explained above and may be modified in various ways. Alternatively, the above embodiments can be appropriately combined.

A wireless communication system was illustrated above as an embodiment of the present invention, but the present invention is not limited to a wireless communication system. It may also be applied to a wired communication system.

Summarizing the effects of the invention, according to the present invention, a signal component demultiplexing apparatus capable of adequately demultiplexing a multi-carrier modulated signal can be provided.

Further, a signal component demultiplexing apparatus for demultiplexing a signal to a group of $2^c$ signals (c is any integer) from one group of input multi-carrier modulated signals can be provided.

Further, a filter apparatus for selecting specific one output group of signals from among one group of input multi-carrier modulated signals can be provided.

Further, a suitable receiving apparatus having the above signal component demultiplexing apparatus an be provided.

The receiving apparatus of the present invention can achieve a small circuit scale of FFT and further high speed FFT processing.

According to the present invention, a suitable receiving apparatus having the above filter apparatus can be provided.

In the receiving apparatus of the present invention, the circuit scale of the FFT can be made smaller and the FFT processing can be carried out at a high speed.

Further, a communication system wherein the transmitting apparatus for the multi-carrier modulation and the above receiving apparatus cooperate can be provided.

Further, a communication method for multi-carrier modulation and demodulation can be provided.

While the invention has been described by reference to specific embodiments chosen for purposes of illustration, it should be apparent that numerous modifications could be made thereto by those skilled in the art without departing from the basic concept and scope of the invention.

The invention claimed is:

1. A receiving apparatus for multiplex communication based on multi-carrier modulation in which a plurality of channels of subcarriers are cyclically arranged, the receiving apparatus comprising:

receiving means for receiving a group of multi-carrier modulated signals;

switching means for switching the group of signals;

buffer means for holding the group of multi-carrier modulated signals received by the receiving means;

a filter apparatus connected after the switching means for selecting and outputting a subgroup of signals from the group of signals;

orthogonal transforming means for orthogonally transforming the subgroup of signals output by the filter apparatus; and decoding means for decoding the orthogonally transformed subgroup of signals, wherein the switching means transmits one symbol of the subgroup of signals to the filter apparatus and transmits the group of signals held by the buffer means to the filter apparatus after transmitting the one symbol to the filter apparatus, and the filter apparatus selects and outputs a designated subcarrier from the group of signals input via the switching means, wherein the filter apparatus includes:

a signal component demultiplexing apparatus having a plurality of branching circuits connected in stages and hierarchically by a branching method, each branching circuit including a symbol delaying means for delaying an input group of signals by $N/2^{(m+1)}$ symbols, phase offset adjusting means for shifting a phase of the input group of signals by $-\pi(k/2^m)$ radians with a reference of 0 Hz, adding means for adding an output signal of the symbol delaying means and an output signal of the phase offset adjusting means to calculate one symbol string alternately positioned on a frequency axis in a multiplexed signal input to signal selecting and outputting means, and subtracting means for subtracting the output signal of the phase offset adjusting means from the output signal of the symbol delaying means to calculate another symbol string alternately positioned on the frequency axis in the multiplexed signal input to the signal selecting and outputting means, wherein m is a parameter indicating a position of a stage of each branching circuit, N is a number of symbols existing within one modulation time, and k is a parameter indicating that a group of signals having a frequency offset of a subcarrier is input with the reference of 0 Hz;

signal selecting means for selecting and outputting a group of symbols of a specific subcarrier from among the symbol strings demultiplexed by the signal component demultiplexing apparatus; and frequency offset compensating means for compensating for a frequency offset of the group of symbols selected and output by the signal selecting means.

2. A receiving apparatus for multiplex communication based on multi-carrier modulation in which a plurality of channels of subcarriers are cyclically arranged, the receiving apparatus comprising:

receiving means for receiving a group of multi-carrier modulated signals;

switching means for switching the group of signals;

buffer means for holding the group of multi-carrier modulated signals received by the receiving means;

a filter apparatus connected after the switching means for selecting and outputting a subgroup of signals from the group of signals;

orthogonal transforming means for orthogonally transforming the subgroup of signals output by the filter apparatus; and decoding means for decoding the orthogonally transformed subgroup of signals, wherein the switching means transmits one symbol of the subgroup of signals to the filter apparatus and transmits the group of signals held by the buffer means to the filter apparatus after transmitting the one symbol to the filter apparatus, and the filter apparatus selects and outputs a designated subcarrier from the group of signals input via the switching means, wherein the filter apparatus includes:

pass subcarrier selection signal outputting means for outputting a complex sine wave signal in accordance with a channel to be selected;

multiplying means for multiplying the complex sine wave signal and the group of signals;

signal component demultiplexing means for selecting a specific group of signals from the results of the multiplication in the multiplying means; and symbol rearranging means for rearranging an output of the signal component demultiplexing means on a frequency axis.

3. A receiving apparatus for multiplex communication based on multi-carrier modulation in which a plurality of channels of the subcarriers are cyclically arranged, the receiving apparatus comprising:

receiving means for receiving a group of multi-carrier modulated signals;

a first filter apparatus for selecting and outputting a subgroup of signals of even number carriers from the group of multi-carrier modulated signals received at the receiving means;

a second filter apparatus for selecting and outputting a group of signals of odd number carriers from the group of multi-carrier modulated signals received at the receiving means, buffer means for holding the output subgroup of signals of the second filter apparatus;

switching means for switching the output subgroup of signals of the first filter apparatus;

orthogonal transforming means connected after the switching means and orthogonally transforming the switched output signals; and decoding means for decoding the orthogonally transformed signals, wherein the switching means transmits the output signals of the first filter apparatus to the orthogonal transforming means and transmits the subgroup of signals held by the buffer means to the orthogonal transforming means after transmitting the output signals of the first filter apparatus to the orthogonal transforming means.

4. The receiving apparatus as set forth in claim 3, wherein each of the first filter apparatus and the second filter apparatus includes:

a signal component demultiplexing apparatus including a plurality of branching circuits connected in stages and hierarchically by a branching method, each branching circuit having symbol delaying means for delaying an input group of signals by $N/2^{(m+1)}$ symbols, phase offset adjusting means for shifting the phase of the input group of signals by $-\pi(k/2^m)$ radians with a reference of 0 Hz, adding means for adding an output signal of the symbol delaying means and an output signal of the phase offset adjusting means to calculate one symbol string alternately positioned on a frequency axis in a multiplexed signal input to signal selecting and outputting means, and subtracting means for subtracting the output signal of the phase offset adjusting means from the output signal of the symbol delaying means to calculate another symbol string alternately positioned on the frequency axis in the multiplexed signal input to the signal selecting and outputting means, wherein m is a parameter indicating a position of a stage of each branching circuit, N is a number of symbols existing within one modulation time, and k is a parameter indicating that a group, of signals having a frequency offset of a subcarrier is input with a reference of 0 Hz;

signal selecting means for selecting and outputting a group of symbols of a specific subcarrier from among the symbol strings demultiplexed at the signal component demultiplexing apparatus; and frequency offset compensating means for compensating for the frequency offset of the group of symbols selected and output by the signal selecting means.

5. The receiving apparatus as set forth in claim 3, wherein each of the first filter apparatus and the second filter apparatus includes:

subcarrier selecting means for selecting a subcarrier;

signal selecting means for selecting and outputting a subgroup of signals from among the group of signals in accordance with the selected subcarrier; and frequency offset compensating means for compensating the frequency offset of a signal selected by the signal selecting means.

6. The receiving apparatus as set forth in claim 3, wherein each of the first filter apparatus and the second filter apparatus includes:

pass subcarrier selection signal outputting means for outputting a complex sine wave signal in accordance with a channel to be selected;

multiplying means for multiplying the complex sine wave signal and the group of signals;

signal component demultiplexing means for selecting a specific group of signals from the results of the multiplication in the multiplying means; and symbol rearranging means for rearranging an output of the signal component demultiplexing means on a frequency axis.

* * * * *